United States Patent
Kenney

(10) Patent No.: US 11,861,726 B2
(45) Date of Patent: *Jan. 2, 2024

(54) METHOD AND SYSTEM FOR COLLABORATIVE INSPECTION OF INSURED PROPERTIES

(71) Applicant: STATE FARM MUTUAL AUTOMOBILE INSURANCE COMPANY, Bloomington, IL (US)

(72) Inventor: Stuart D. Kenney, Heyworth, IL (US)

(73) Assignee: STATE FARM MUTUAL AUTOMOBILE INSURANCE COMPANY, Bloomington, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/730,684

(22) Filed: Apr. 27, 2022

(65) Prior Publication Data

US 2022/0253946 A1 Aug. 11, 2022

Related U.S. Application Data

(63) Continuation of application No. 17/190,104, filed on Mar. 2, 2021, now Pat. No. 11,367,145, which is a (Continued)

(51) Int. Cl.
*G06Q 40/08* (2012.01)
(52) U.S. Cl.
CPC .................... *G06Q 40/08* (2013.01)
(58) Field of Classification Search
None
See application file for complete search history.

(56) References Cited

U.S. PATENT DOCUMENTS 5,856,931 A * 1/1999 McCasland ............ G06Q 10/06
702/182
8,046,281 B1 10/2011 Urrutia
(Continued)

OTHER PUBLICATIONS

Johnson, Denise, "The Future of Drone Use in the Insurance Industry," The Claims Journal, Mar. 3, 2014, retrieved from the Internet on Jun. 3, 2015 http://www.claimsjournal.com/news/national/2014/03/03/245393.htm.
(Continued)

*Primary Examiner* — Christopher Bridges

(57) ABSTRACT

Methods, systems, apparatus, and non-transitory computer readable media are described for conducting collaborative real-time inspections of insured properties. The system may include several workstations, each operated by a different user with a respective role in processing an insurance claim. The system also may include a server system configured to receive an indication of an insured property to be inspected by users at the workstations using an unmanned aerial vehicle (UAV) configured to collect aerial imagery, provide, substantially in real time during an inspection session, aerial imagery of the insured property to each of the workstations, receive, substantially in real time during the inspection session, information related to the insured property being inspected from the workstations, and generate a database record descriptive of the inspection session. The aerial imagery may be used to verify dimensions of insured homes or estimate home damage resulting from fire, wind, hail, water, or hurricanes.

20 Claims, 15 Drawing Sheets

Related U.S. Application Data continuation of application No. 15/164,617, filed on May 25, 2016, now Pat. No. 10,977,734.

(60) Provisional application No. 62/168,423, filed on May 29, 2015.

(56) References Cited

U.S. PATENT DOCUMENTS

| | | | | |
|---|---|---|---|---|
| 8,346,578 | B1* | 1/2013 | Hopkins, III | G06Q 30/02 705/14.66 |
| 9,162,753 | B1* | 10/2015 | Panto | G08G 5/0069 |
| 9,488,979 | B1* | 11/2016 | Chambers | G05D 1/0088 |
| 9,505,494 | B1* | 11/2016 | Marlow | G06Q 40/08 |
| 9,563,201 | B1* | 2/2017 | Tofte | G05D 1/0038 |
| 9,613,538 | B1* | 4/2017 | Poole | G06V 20/58 |
| 10,311,302 | B2 | 6/2019 | Kottenstette et al. | |
| 10,366,288 | B1 | 7/2019 | Kottenstette et al. | |
| 10,643,072 | B2 | 5/2020 | Kottenstette et al. | |
| 11,151,378 | B2 | 10/2021 | Kottenstette et al. | |
| 11,210,552 | B2 | 12/2021 | Kossyk et al. | |
| 11,222,426 | B2 | 1/2022 | Richter et al. | |
| 11,232,150 | B2 | 1/2022 | Vianello et al. | |
| 11,367,265 | B2 | 6/2022 | Vianello et al. | |
| 2006/0059021 | A1* | 3/2006 | Yulman | G06Q 10/00 705/4 |
| 2007/0100669 | A1* | 5/2007 | Wargin | G06Q 10/06316 705/7.26 |
| 2009/0265193 | A1* | 10/2009 | Collins | G06Q 30/0185 901/46 |
| 2013/0060710 | A1* | 3/2013 | Preuss | G06Q 50/163 705/314 |
| 2013/0317667 | A1 | 11/2013 | Kruglick | |
| 2014/0164039 | A1 | 6/2014 | Mitti et al. | |
| 2014/0316616 | A1 | 10/2014 | Kugelmass | |
| 2015/0170288 | A1 | 6/2015 | Harton et al. | |
| 2015/0248730 | A1 | 9/2015 | Pilot et al. | |
| 2015/0363717 | A1 | 12/2015 | Lim | |
| 2016/0203443 | A1 | 7/2016 | Wheeling | |
| 2016/0307447 | A1* | 10/2016 | Johnson | H04B 7/18506 |
| 2017/0206414 | A1 | 7/2017 | Schultz et al. | |

OTHER PUBLICATIONS

Office Action for U.S. Appl. No. 17/190,104, dated Oct. 28, 2021.

* cited by examiner

METHOD AND SYSTEM FOR COLLABORATIVE INSPECTION OF INSURED PROPERTIES

CROSS-REFERENCE TO RELATED APPLICATION

The present application is a continuation of, and claims the benefit of, U.S. patent application Ser. No. 17/190,104, filed on Mar. 2, 2021, entitled "Method and System for Collaborative Inspection of Insured Properties," which claims the benefit of U.S. patent application Ser. No. 15/164,617, filed on May 25, 2016, entitled "Method and System for Collaborative Inspection of Insured Properties," which claims the benefit of U.S. Provisional Patent Application No. 62/168,423, filed on May 29, 2015, entitled "Method and System for Collaborative Inspection of Insured Properties," the disclosure of each of which is hereby expressly incorporated by reference herein in its entirety.

TECHNICAL FIELD

The present disclosure generally relates to systems, methods, apparatus, and non-transitory computer readable media for inspecting insured properties and, more particularly, to providing a computing environment for collaborative aerial inspection of insured properties, such as by multiple participants in different organizational roles.

BACKGROUND

When an insurer adjusts an insurance claim for structural property damage, it typically starts with a physical inspection of the property. The inspection may include creating a record of the inspection and the insurer's findings, including photographs, measurements and drawings. The insurer uses such information in assessing policy coverage, estimating repair costs and concluding the claim.

The inspection documentation may also be used to explain to the policyholder the reasons for insurer's adjustment of the claim. The information typically is also provided to third-parties involved in the claim, such as public adjusters, contractors, experts, appointed independent appraisers and sometimes the courts.

For all these purposes, it is important for the inspection to be thoroughly conducted and documented. Nonetheless, there can be multiple inspections, for example because of differences concerning the existence and scope of covered damage, types of construction or materials and/or required repairs and associated costs.

Each additional inspection inconveniences the policyholder and delays final resolution of the claim. Such delays can be lengthy because of multi-participant scheduling challenges. Moreover, as to the insurance industry generally, additional inspections increase loss adjustment expenses and therefore insurance rates.

BRIEF SUMMARY

Many of the foregoing challenges to expeditious final adjustment may be eliminated or diminished by the present embodiments, which may include an early inspection of all exterior surfaces of the structure, ideally with the policyholder or a representative, in which pertinent data is collected and can be analyzed in multiple modes. The objective is creating, from inception, a record of the entire exterior, which may foreclose the utility of further inspections at any stage of claim resolution. Additional inspections required by conventional techniques would be rendered unnecessary by compilation of a visual and empirical record of all exterior structure surfaces by an automated system that acquires inspection data in a quantity, quality and interpretive usefulness that equals or exceeds traditional inspections.

As noted above, multiple inspections and the delays associated with them can be minimized by the present embodiments, which may include a system that is independently certified to acquire in a single inspection, and in an automated and uniform process, all information that could be acquired by multiple inspections. For further efficiency, such a system may offer remote, real-time participation by the insured and any third-parties, thereby facilitating early claim settlement and minimizing insured inconvenience.

These and other goals may be achieved with an unmanned aerial vehicle (UAV) structural loss inspection and adjustment system (UAS) that includes, without limitation, the following functionalities, technologies and operations:

A UAV of appropriate design to perform the functions described herein with minimal variation among inspections and differing operating conditions, such design considerations to include weight, stabilization, configuration and reliable operation of control systems and systems for telemetry, data collection, potential damage detection and inspection utilities, such as illumination and magnification.

Such UAV to be ground transported to loss locations and operated by a duly authorized pilot (Pilot), such operation to be both programmatically and manually limited to the boundaries of the subject premises, as determined by GPS coordinates set in a pre-inspection fly-around of the premises.

An automated process, subject to management approval, may assign the Pilot according to factors such as workload, proximity and prioritization of inspections, such as to prevent further damage and assessment of habitability. The UAV may transmit inspection data telemetrically from and to the Pilot's UAV operating system. The inspection data, at the insurer's discretion, may be further transmitted in real-time to remote Attendees, including the policyholder and any then involved and authorized third parties, such as public adjusters, contractors, appraisers and others. To the extent determined by the insurer, there may be real-time channels of language communication among the Pilot and/or the Attendees, to facilitate a collectively acceptable inspection and record of such.

In all inspections, one of the remote attendees will be a Structural Loss Estimator (SLE), located in a centralized operation. The SLE may collaborate with the Pilot to ensure a thorough inspection generates the insurer's loss estimate as the inspection is proceeding. The SLE will have real-time access to available third-party information sometimes utilized in loss adjusting, including weather data, product identification resources, property records, and building codes.

After the GPS property boundaries are acquired in the initial fly-around, another pre-inspection flight focused on the structure may capture all dimensional and other data necessary for the UAV to perform an automated inspection and data collection as to every point on the exterior surface of the structure. The inspection data may be acquired from uniform distances and magnifications set by the insurer. Such programmatic flight ensures all UAV inspections are consistently thorough, detailed and may minimize the risk of human error or claims of the same.

Structure surface data may be acquired by imagery, radar and/or sonar sufficient for product identification by the SLE and detection of aberrations, such as dimples, dents, lifted shingles and depth variations indicative of impact or damage, including hail or wind damage.

The Pilot may assume manual control of the UAV to focus the inspection on specific parts of the surface, after which the UAV may resume automated inspection from the point at which the Pilot assumed control.

As to Attendees, the insurer may set standards governing the extent to which, if any, Attendees may actively participate in the inspection, possibly to include requests to focus on specific points and discussions with the Pilot and SLE about the existence, nature, causation and cost of possible damage. The Pilot and SLE may have authority to terminate an Attendee's participation or attendance if they determine the Attendee is impeding the inspection.

If the policyholder requests an interior inspection, it may be conducted in a similar manner, to the extent possible, by a handheld device and/or UAV designed for interior inspections.

In a visible manner, the SLE may identify electronically the damage. The damage identification may be linked to the corresponding line items in the estimate. The insurer may request that the policyholder or an attending representative also identify, in a distinguishing manner, locations they contend to be covered damage. This can help to establish points of disagreement and foster immediate resolution of the same.

As a final step in the inspection, the Pilot may inquire whether any attendees desire further inspection of specific parts of the structure.

The SLE may then finalize the insurer's estimate, electronically transmit it to appropriate parties, and immediately issue payment electronically (or by mail) to an account designated by the policyholder or, as authorized, to an account designated by a policyholder representative.

If authorized by the policyholder, the inspection data and estimate may be uploaded to a secure internet site created by the insurer for such purposes. The policyholder may authorize additional parties to access and download the information, such as those previously identified.

As determined by the insurer, the inspection data may be shared for business purposes with other operations, such as Underwriting, Actuarial and Research.

In some embodiments, to perform an inspection of insured property that has potentially sustained damage, a computing system may provisionally assign the task of inspecting the property using an UAV, commonly referred to as "drone," to an inspection technician selected based upon such factors as availability, proximity to the insured property, etc. If properly authorized, this technician may assume the role of the pilot of the UAV. After a user in a supervisory role confirms that the assignment has been accepted, the system may provide relevant information about the insured property to the inspection technician, which may include the type of construction, cladding, number of stories, dimensions, etc. The system then may set up an inspection session during which the inspection technician controls the UAV to collect aerial imagery of the property, and other participants (used interchangeably with "attendees" in this application) may provide comments, requests, and/or directions, which are relayed to the inspection technician in real-time. In at least some of the embodiments, for every inspection the participants include a SLE who collaborates with the pilot to ensure an insurer's loss estimate is generated, and that the inspection otherwise conforms to the established procedure. The participants also may include customer representatives, the insurance company, experts, public adjusters, and possibly third parties such as contractors or appraisers. The system may create a record of the inspection session, which may include photographs, video, indications of time and location, comments entered by the participants, and/or relevant documents submitted by the participants, for example. If desired, the system may allow the participants to electronically sign the record and effectively generate a self-authenticating document.

In some cases, the system may generate a sequence of properties to inspect, for one or more inspection technicians. The system also may optimize the order in which the properties are inspected to better utilize UAV resources as well as technician time. More generally, by providing an opportunity to participate in a collaborative real-time inspection, the system may reduce and even eliminate the need to send inspectors to on-site inspections, conduct multiple inspections of the same property, and/or coordinate schedules of different parties. Moreover, the system may simplify the process of sharing documentation, photography and video, other data, etc.

In one example embodiment of these techniques, a system for collaborative, real-time inspection of insured properties may be provided. The system may include multiple workstations, each operated by a different user with a respective role in processing an insurance claim, and/or a server system in communication with the workstations. The server system may be configured to receive an indication of an insured property to be inspected by the users at the workstations using an UAV configured to collect aerial imagery. One of the workstations may be an operator workstation with control over the UAV, i.e., a duly authorized pilot. The server system may further be configured to (i) provide, substantially in real time during an inspection session, aerial imagery of the insured property to the workstations, (ii) receive, substantially in real time during the inspection session, information related to the insured property being inspected from at least some of workstations, and/or (iii) generate a database record descriptive of the inspection session. The aerial imagery may be used calculate premiums or discounts for new insurance policies (such as homeowners or renters insurance), adjust premiums or discounts for existing insurance policies, estimate damage to insured properties, and/or handle insurance claims. The system may include additional, fewer, or alternate components and functionality, including that discussed elsewhere herein.

In another example embodiment of these techniques, a computer-implemented method for conducting a collaborative, real-time inspection of insured properties may be provided. The method may be executed on one or more processors, for example. The method may include (i) receiving an indication of an insured property to be inspected by respective users at several workstations using an unmanned aerial vehicle (UAV) configured to collect aerial imagery. Each of the workstations may be operated by a different user with a respective role in processing an insurance claim, and/or one of the workstations may be an operator workstation with control over the UAV. The method may further include (ii) providing, substantially in real time during an inspection session, aerial imagery of the insured property to each of the workstations, (iii) receiving, substantially in real time during the inspection session, information related to the insured property being inspected from at least some of the workstations, and/or (vi) generating a database record descriptive of the inspection session for storing in a database implemented on a non-transitory computer-readable medium. The method may include processing the aerial imagery, via one or more processors, to calculate premiums or discounts for new insurance policies (such as homeowners or renters insurance), adjust premiums or discounts for existing insurance policies, estimate damage to insured properties, and/or handle insurance claims. The method may include additional, less, or alternate actions, including those discussed elsewhere herein, and may be implemented via one or more processors and/or communication networks.

BRIEF DESCRIPTION OF THE DRAWINGS

The figures described below depict various aspects of the system and methods disclosed therein. It should be understood that each figure depicts an embodiment of a particular aspect of the disclosed system and methods, and that each of the figures is intended to accord with a possible embodiment thereof. Further, wherever possible, the following description refers to the reference numerals included in the following figures, in which features depicted in multiple figures are designated with consistent reference numerals.

There are shown in the drawings arrangements which are presently discussed, it being understood, however, that the present embodiments are not limited to the precise arrangements and instrumentalities shown, wherein.

Figure 1:
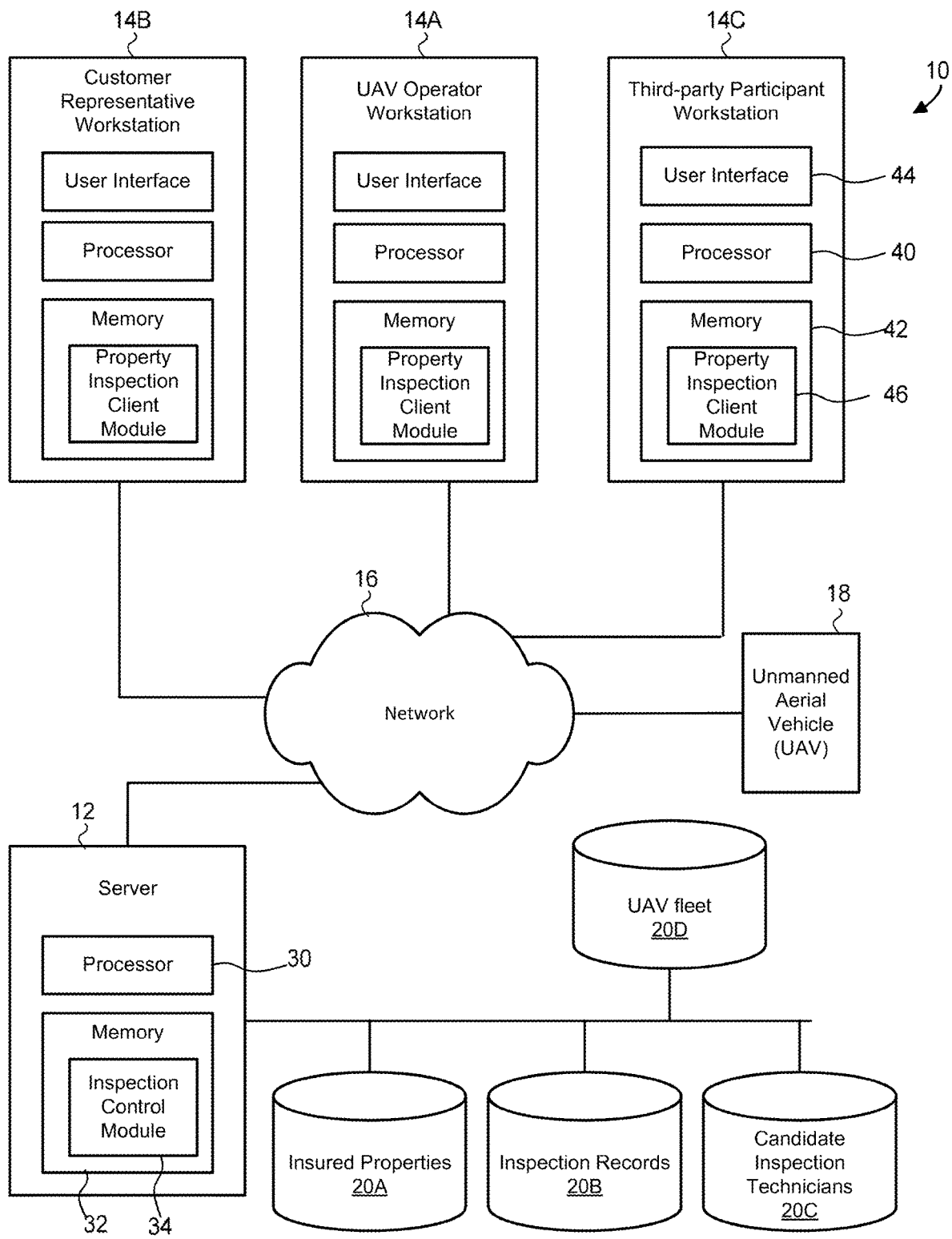
FIG. 1 illustrates a block diagram of a computing environment in which an example system for collaborative real-time inspection of insured property may operate in accordance with an example aspect of the present disclosure.

The figures depict preferred embodiments for purposes of illustration only. One skilled in the art will readily recognize from the following discussion that alternative embodiments of the systems and methods illustrated herein may be employed without departing from the principles of the invention described herein.

DETAILED DESCRIPTION

To allow parties to investigate and settle insurance claims more quickly and efficiently, a system of this disclosure allows the parties to conduct inspections of insured properties substantially in real time, and in a collaborative manner, using a single unmanned aerial vehicle (UAV) or several UAVs. In some embodiments, the system may include one or several servers configured to automatically set up an online inspection session in which insurers, customer representatives, and various third parties may participate. The various parties may join the online inspection session via workstations from their respective locations. As discussed below, the workstations need not be dedicated machines and in general may include personal non-portable computers, personal portable computers, and/or mobile devices (such as smartphones, laptops, tablets, phablets, smart watches, wearable electronics, etc.).

To ensure safety, only one workstation, operated by an inspection technician, may be authorized to control the UAV, in some embodiments. The other participating parties may be allowed to view the video feed from the UAV, submit requests (e.g., "please capture additional images of the western wall"), submit comments, share documents, and/or otherwise actively participate in the inspection session. The system may then create a record of the inspection ("inspection record") using the data captured by the UAV, as well as the input from the parties of the inspection. In some embodiments, the parties may digitally sign the inspection record prior to the system saving the inspection record in a database. Further, in some embodiments and/or scenarios, the authorized parties can prepare and submit an offer to a policy holder, potentially saving time and effort associated with a longer resolution process.

In addition to storing inspection records, the system may store records descriptive of properties to be insured, as well as records for various inspection technicians. To make multiple inspections more efficient, the one or more servers operating as part of the system may generate a prioritized list of properties to be inspected and provisionally assign candidate inspection technicians for each property. The one or more servers may create the prioritized list in view of geography (e.g., to schedule inspections of nearby properties consecutively), availability of inspection technicians, particular expertise of inspection technicians, etc. The system may notify a user in a supervisory role regarding the provisional assignments and receive a confirmation (or a rejection) of the assignments.

Generally speaking, the techniques for conducing collaborative real-time inspections may be implemented in one or more network servers, in one or more client devices, or a system that includes several of these devices. However, for clarity, the examples below focus primarily on embodiments in which one or more server devices set up and facilitate online collaborative inspection sessions via a wide-area network, such as the Internet.

Example Computing Environment for Conducting Colloborative Inspections

FIG. 1 illustrates various aspects of an example computing environment implementing a collaborative inspection system 10. The system 10 may include a server device 12 and several workstations 14A-C, all of which may be communicatively interconnected via a communication network 16, as described below. In an example configuration, an inspection technician may use the workstation 14A to control an unmanned aerial vehicle (UAV) 18 to inspect an insured property, such as a house damaged by fire, water, wind, hail, and/or weather; a customer representative may use the workstation 14B to monitor progress of the ongoing inspection, submit comments, and/or view aerial imagery in real-time; and/or a third-party participant may use the workstation 14C to similarly participate in the inspection substantially in real time. In other configurations, different groups of users may participate in online inspections via different group workstations.

As discussed in more detail below, the server device 12 during operation may access databases 20A-D storing data related to insured properties, inspection records, candidate inspection technician records, and/or UAV equipment, respectively. The server device 12 may include may include one or more processor(s) 30, such as a central processing unit (CPU), coupled to a memory 32 via a digital bus or another type of a link (not shown). The memory 32 may be tangible, non-transitory memory and may include any types of suitable memory modules, including random access memory (RAM), read-only memory (ROM), flash memory, other types of persistent memory, etc. The memory 32 may store data as well as instructions executable on the processor(s) 30. These instructions may implement, among other functionality, an inspection control module 34 configured to set up online collaborative inspections, coordinate exchange of information between the workstations 14A-C regarding inspection sessions, create inspections records to be stored in the database 20B, etc., as discussed in more detail below. More generally, in various embodiments, the server device 12 may include hardware, firmware, and/or software components.

It will be appreciated that although only one server device 12 is depicted in FIG. 1, multiple servers 12 may be provided for the purpose of distributing server load, serving different web pages, etc. These servers 12 may include a web server, an entity-specific server (e.g. an Apple® server, etc.), a server that is disposed in a corporate or proprietary network, etc.

The server device 12 may communicate with the workstations 14A-C via the communication network 16. The network 16 may be a proprietary network, a secure public Internet, a local area network (LAN), a wide area network (WAN), a virtual private network (VPN) or some other type of network, such as dedicated access lines, plain ordinary telephone lines, satellite links, combinations of these, etc. Where the communication network 16 comprises the Internet, data communication may take place over the digital network 130 via an Internet communication protocol. In some embodiments, the communication network 16 may be a password protected organizational network where only members of the organization having user accounts may access the network.

In some embodiments, the databases 20A-D may be implemented in a single device or a group of devices. In other embodiments, each of the databases 20A-D may be implemented separately in a respective server or group of servers. The databases 20A-D may be implemented as relational databases, for example, made up of tables stored on a non-transitory, computer-readable memory.

The insured property database 20A may store information about insured properties, including real properties. For example, a certain record in the insured property database 20A may specify the boundaries of a parcel of land, the age of the structure built on the parcel of land, various properties of the structure (such as the number of rooms), whether or not the property includes a garage, the type of roof, the types of electrical and gas connections, etc.

The inspection records database 20B may store records describing ongoing or completed inspections sessions. For example, a certain record in this database may specify the date and time that the collaborative online inspection was conducted, the names and organizational roles of the participants, the comments submitted by the participants, whether or not the participants submitted any documents prior to or during the inspection, the type of the UAV 18 used for the inspection, etc. Further, the record may include photographs or even a video recording of the inspection as captured by the UAV 18. Still further, the record may include authentication data such as digital signatures of the participants, for example. In this manner, the records in the inspection records database 20B may be used as evidence in disputes or other procedures.

The candidate inspection technician database 20C may store information about inspection technicians that potentially may be available to participate in online collaborative inspections as operators of UAVs, such as the UAV 18. An example record in the candidate inspection technician database 20C may specify the availability of a certain inspection technician, various restrictions regarding the type of equipment he or she may be authorized to handle, etc.

Further, the UAV database 20D may store information about the available fleet of UAVs. The records in this database may include indications of technical capabilities of the UAVs (e.g., the video equipment, the number or quality of cameras, the range of flight, the amount of fuel remaining), as well as indications of the current locations of the corresponding to the UAVs (e.g., GPS coordinates). It is noted that, in addition to long-range UAVs, the fleet can include smaller, portable devices such as miniature or small UAVs, which inspectors can carry with them and launch while on-site. In some cases, the system 10 may automatically select candidate UAVs from among multiple UAVs in the fleet based on such considerations as weight, stabilization parameters, illumination and magnification capabilities, etc. in view of the inspection parameters such as the approximate size of the property to be inspected, the approximate distance to the property, the current weather, etc. The system 10 then may provide an automatic recommendation to an operator workstation (see below) to reduce the amount of time required to select the equipment.

More generally, the system 10 may include additional databases or, conversely, not include some of the databases illustrated in FIG. 1. It is noted that FIG. 1 illustrates the databases 20A-C by way of example only.

With continued reference to FIG. 1, the workstations 14A-C may include, by way of example, various types of "mobile devices," such as a smartphone, a tablet computer, a cell phone, a personal digital assistant (PDA), a laptop computer, a desktop computer, a wearable computing device, smart glasses, smart watches or bracelets, phablets, other smart devices, devices configured for wired or wireless RF (Radio Frequency) communication, etc. In general, any electronic device appropriately configured may interact with the server 12 via the network 16. Thus, the workstations 14A-C may include general-purpose devices or special-purpose devices developed specifically to operate in the system 10.

As illustrated in FIG. 1, each of the workstations 14A-C may include one or more processor(s) 40, a memory 42, and a user interface 44, interconnected via one or several digital busses, for example (not shown). Similar to the processor(s) 30, the processor(s) 40 may include general-purpose processors such as CPUs or special-purpose processing units, such as application-specific integrated circuits (ASICs). The memory 42 may include one or several non-transitory memory components, such as a RAM, a ROM, a flash drive, a hard disk, etc. The user interface 44 may include a touchscreen or a display-only screen, a speaker, one or more user-input devices such as a keyboard or a microphone, etc.

In addition to the illustrated components, the workstations 14A-C may include additional components such as a communication unit to communication with the server 12 via any suitable wireless communication protocol network, such as a wireless telephony network (e.g., GSM, CDMA, LTE, etc.), a Wi-Fi network (802.11 standards), a WiMAX network, a Bluetooth network, etc.

The workstations 14A-C need not necessarily communicate with the network 16 via a wired connection. In some instances, the workstations 14A-C may communicate with the network 16 via wireless signals (e.g., radio frequency (RF) communication and data transmission) and, in some instances, may communicate with the network 16 via an intervening wireless or wired device, which may include a wireless router, a wireless repeater, a base transceiver station of a mobile telephony provider, etc. The workstations 14A-C may include devices which are used by members of an organization to access an organizational communication network, such as a local area network (LAN), a virtual private network (VPN), etc.

Each of the workstations 14A-C may interact with the server device 12 to receive web pages and/or server data, and may display the web pages and/or server data via a client application and/or an Internet browser. To this end, the memory 42 may include such software components as an operating system and various software applications (not shown to avoid clutter). The operating system, for example, may include Microsoft Windows®, OS X®, Linux®, Unix®, etc. The software applications may include, for example, a web browser such as Apple Safari®, Google Chrome™, Microsoft Internet Explorer®, and Mozilla Firefox® that may be implemented as a series of machine-readable instructions for receiving, interpreting, and/or displaying web page information from the server 12 while also receiving inputs from the user.

The memory 42 also may store instructions, executable on the processor(s) 40, that implement a property inspection client module 46. In operation, the property inspection client module 46 may provide graphical user interface screens including a list of other participants in the inspection session, various icons and/or interactive controls for submitting comments or requests, submitting documents, zooming in or out on the photographs and/or the video feed, etc. Example functionality of the property inspection client module 46 is further discussed below. The memory 42 also may include data storage regions that include such data as user profiles, application data for the software applications, and/or other data necessary to interact with the server 12 through the communication network 16.

In some embodiments, the workstations 14A-C may gain access to online inspection sessions upon verification of user accounts of the corresponding users. These users then may access secure data assets shared within the network based upon permissions associated with security groups corresponding to the user accounts. Moreover, some or all of the workstations 14A-C may also include devices which may be used to set and/or change permissions for security groups to access secure data assets, and to place and/or remove user accounts from security groups. For example, some or all the workstations 14A-C may include a client device used by a system administrator and/or security analyst.

Example Unmanned Aerial Vehicle

Figure 2:
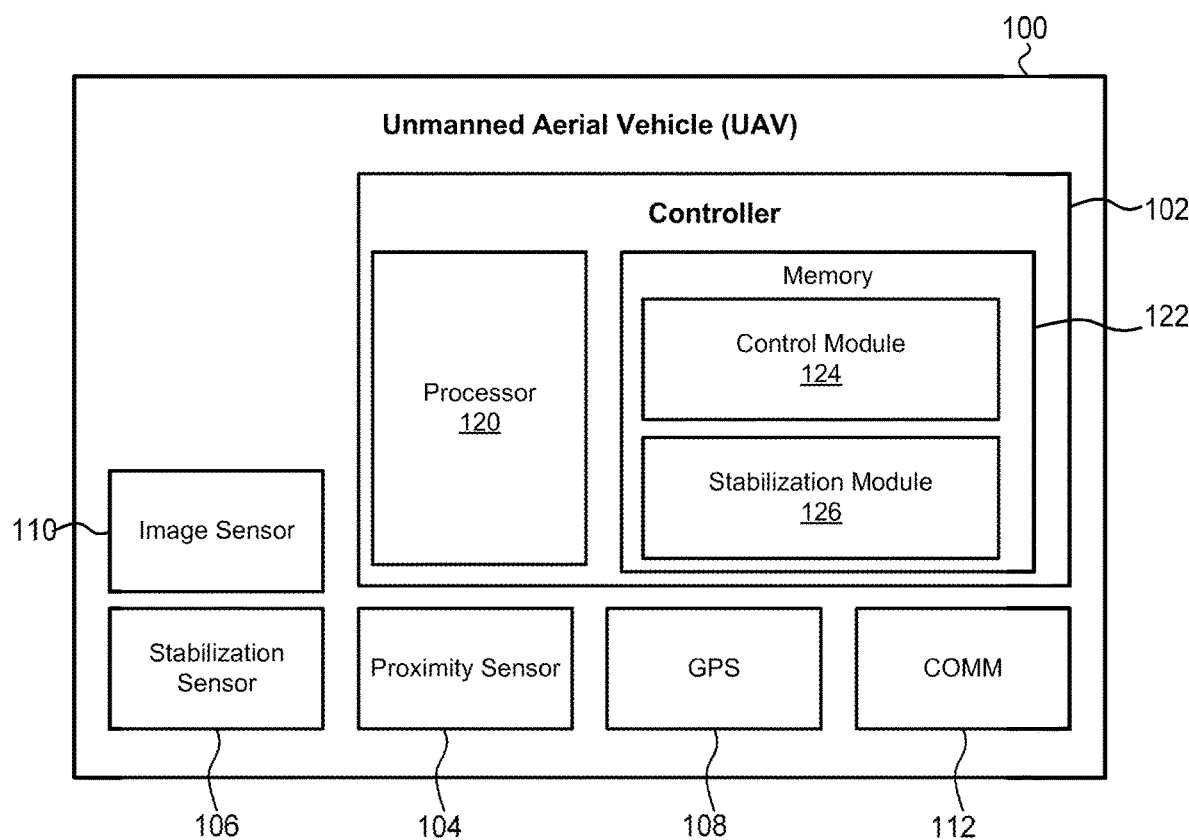
FIG. 2 illustrates a block diagram of an example unmanned aerial vehicle (UAV), or drone, in accordance with an example aspect of the present disclosure.

The UAV 18 may be implemented, for example, as a UAV 100 illustrated in FIG. 2. The UAV 100 may include a controller 102 that communicates with one or more proximity sensors 104, one or more stabilization sensors 106, a Global Positioning System (GPS) unit 108, an image sensor 110, and/or a communications unit 112. The image sensor 110 may include one or more filters for infrared imaging, hyperspectral imaging, multispectral imaging, full spectral imaging, etc., or alternatively, the image sensor 110 may include one or more sensors which receive image data outside of the visible light spectrum, such as an infrared image sensor.

The controller 102 may include a processor 120 that executes instructions from a computer-readable memory 122 to implement a control module 124 and a stabilization module 126. The control module 124 may invoke the stabilization module 126 to retrieve data from the stabilization sensors 106 (i.e., sensors relating avionics) to implement a control function, such as that associated with a control routine that performs PID (proportional-integral-derivative), fuzzy logic, nonlinear, etc. control to maintain the stability of the UAV(s) 100. For instance, the stabilization sensors 106 may include one or more of a directional speed sensor, a rotational speed sensors, a tilt angle sensor, an inertial sensor, an accelerometer sensor, or any other suitable sensor for assisting in stabilization of an aerial craft. Of course, the stabilization module 56 may implement any suitable technique of stabilizing the UAV 100 in a hover or stationary three dimensional position.

The control module 124 may retrieve data from the proximity sensors 104. These proximity sensors 104 may include any sensor or technique that assists the control module 124 in determining a distance and a direction to the insured properties within the neighborhood. The one or more proximity sensors 104 may include optic flow sensors, ultrasonic sensors, infrared sensors, LIDAR (Light Detection and Ranging), a stereo vision system (SVS) that may utilize the image sensors 110 (e.g., one or more cameras) to implement stereoscopic imaging techniques to capture aerial images of the neighborhood including the insured properties and to create 3D images of the insured properties. The control module 124 may also receive instructions from the workstation 14A, for example (see FIG. 1) to capture aerial images at specific locations or time intervals.

The GPS unit 108 may use "Assisted GPS" (A-GPS), satellite GPS, or any other suitable global positioning protocol or system that locates the position of the UAV(s) 100. Moreover, the GPS unit 108 may also determine the position of the aerial images or of data points within the aerial images captured by the UAV(s) 100, or the GPS may be combined with the distance and direction sensors to determine the position of the aerial images, and positions of data points within an aerial image. For example, A-GPS utilizes terrestrial cell phone towers or wi-fi hotspots (e.g., wireless router points) to more accurately and more quickly determine the location of the device while satellite GPS generally are more useful in more remote regions that lack cell towers or Wi-Fi hotspots. The communication unit 112 may communicate with a server or a workstation via any suitable wireless communication protocol network, such as a wireless telephony network (e.g., GSM, CDMA, LTE, etc.), a Wi-Fi network (802.11 standards), a WiMAX network, a Bluetooth network, etc.

Example Inspection Record

Figure 3:
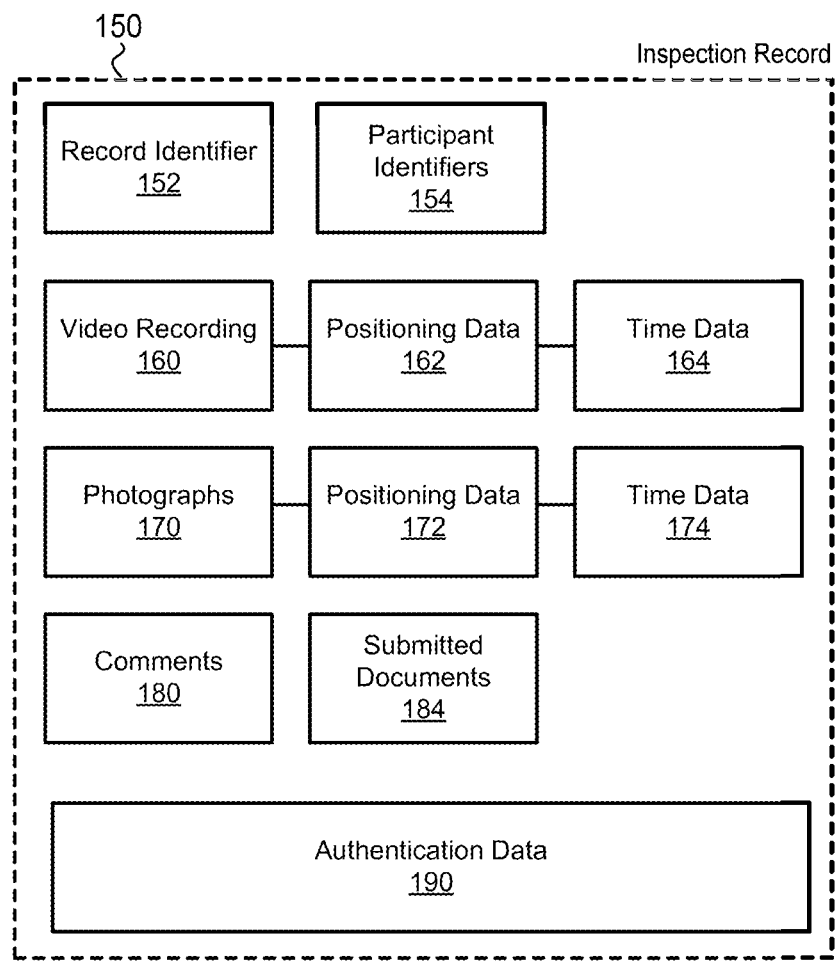
FIG. 3 illustrates an example database record storing information related to a collaborative inspection session in accordance with an example aspect of the present disclosure.

FIG. 3 illustrates an example inspection record 150, which the inspection control module 34, or a similar module may create and maintain in the inspection record database 20B, for example (see FIG. 1). The inspection record 150 may include fields and sub-fields organized and stored in any suitable fashion, such as in multiple tables of a relational database. In some embodiments, certain fields or sub-fields are stored in separate one or more databases, and the inspection record 150 stores only a reference to the corresponding data. In any case, however, the inspection record 150 may define a data structure in which multiple pieces of information related to a certain inspection session are logically linked. One of ordinary skill in the art will recognize that the inspection record 150 is illustrated as an example only, and that the inspection record 150 in other embodiments may include additional fields or, conversely, omit some of the fields depicted in FIG. 3.

The example inspection record 150 may include a record identifier 152, which may be a number or a string of alphanumeric characters, for example. The inspection record 150 may also include identifiers 154 of people who participated in the inspection, which may include an inspection technician operating the UAV, one or several customer representatives, one or several employees of the insurance company, one or several third-party representatives, etc.

During an inspection session, the UAV may capture video and/or still photographic imagery of the property. For example, the inspection technician initially may direct the UAV to fly along the perimeter of the property and then fly over the property at a relatively high altitude. The inspection record 150 may include the video recording for these initial stages as data 160. This data may be stored along with positioning data 162, which may include GPS coordinates, for example, as well as a timestamp 164. Similarly, the inspection record 150 may include photographs 170, stored along with positioning data 172 and a timestamp 174.

Once one or several participants identify certain parts of the property as being "interesting" for the purposes of the inspection, the inspection control module 34 of FIG. 1 may log these requests as part of comments 180 and, once the inspection technician directs the UAV to collected the desired photographic or video imagery, add the imagery to the data 160 and/or 170. The inspection control module 34 may also attach documents, or references to documents, submitted by participants during an online inspection session (field 184).

In an example scenario, the server 12 may create a new inspection record 150 upon receiving an indication that an inspection technician has been approved for the inspection. The server 12 may then update the inspection record 150 during the inspection session in response to various inspection events. More specifically, the server 12 may update the inspection record 150 in response to receiving comments and requests from the participants via the respective workstations, documents received via the workstations, photographs and video imagery from the UAV, etc. The server 12 may then receive an indication that the inspection is completed and request that the participants enter a digital signature, a unique password, or another suitable authentication data. The server 12 may store the authentication data as part of the inspection record 150.

Example Method for Setting Up a New Inspection Session

Figure 4:
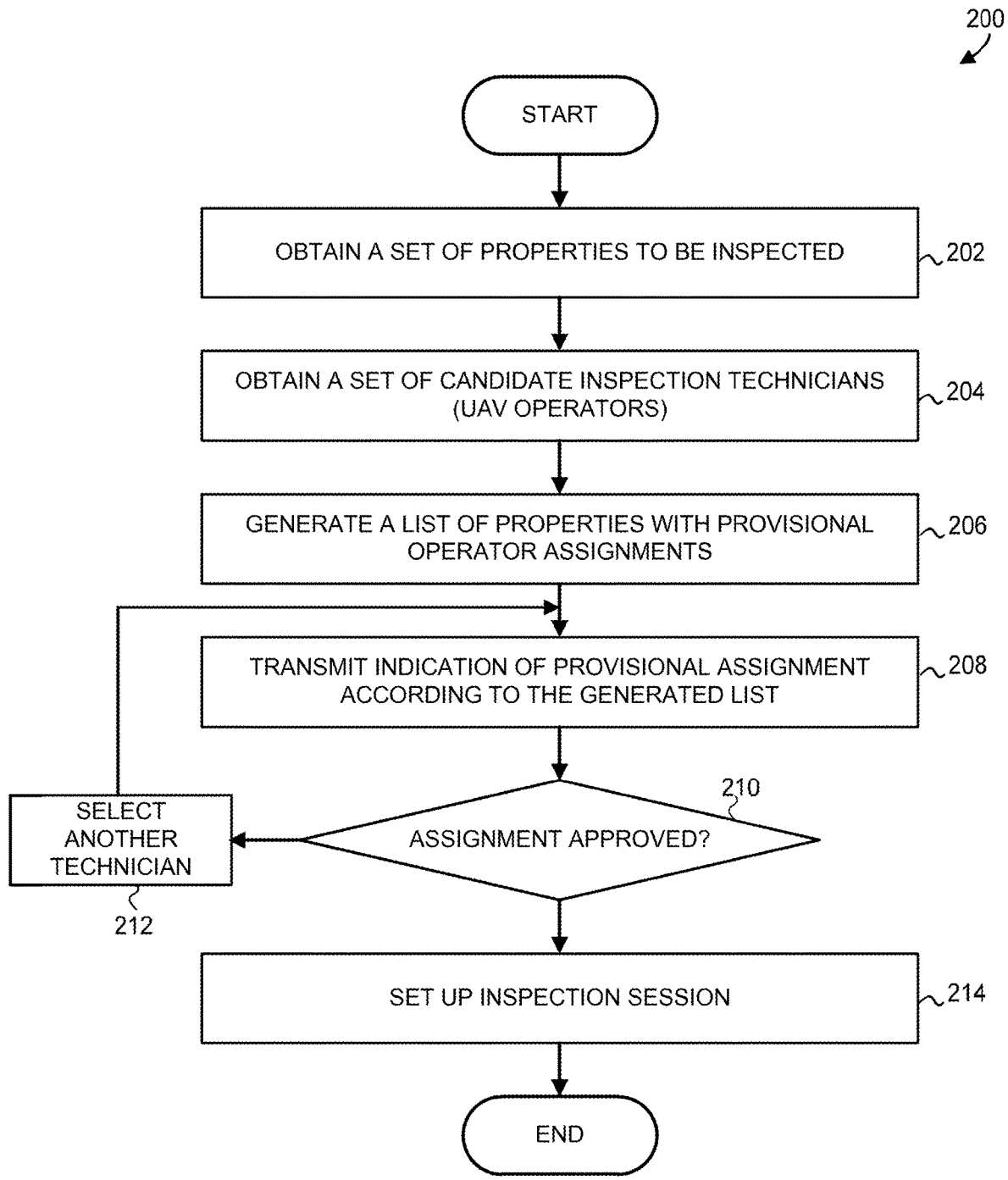
FIG. 4 depicts a flow diagram representing an example computer-implemented method for setting up a collaborative online session in accordance with an example aspect of the present disclosure.

FIG. 4 depicts a flow diagram representing an example computer-implemented method 200 for setting up a collaborative online session. The method 200 may be executed on the server device 12, for example. In some embodiments, the method 200 may be implemented as a set of instructions stored on a non-transitory computer-readable memory and executable on one or more processors of the server device 12. For example, the method 200 may be performed by the inspection control module 34 of FIG. 1.

For convenience, the method 200 is discussed below with reference to the inspection control module 34. However, the method 200 in general may be executed by any suitable device or a group devices, which may be organized according to any suitable hierarchical or distributed topology.

At block 202, the inspection control module 34 obtains a set of properties to be inspected. For example, referring back to FIG. 1, the inspection control module 34 may query the database 20A to determine for which properties an employee of the insurance company requested an inspection, how long the properties have awaited inspection, where these properties are located, what additional requirements exists for online inspections (e.g., a certain property may require that a particular kind of specialist or expert participate, while another property may not), how large the property is and/or how long it would take to inspect it using an UAV, etc.

Next, at block 204, the inspection control module 34 obtains a set of records describing candidate inspection technicians (also referred to in this document as "UAV operators" or "pilots"). Each record may indicate the schedule of the corresponding inspection technician, his or her expertise, the type of equipment he or she is qualified to operate, etc.

Using the information obtained at blocks 202 and 204, the inspection control module 34 may generate a list of properties with provisional operator assignments (block 206). The list may specify which operator is assigned to which property, e.g., $\{O_1 \rightarrow P_1, O_1 \rightarrow P_2, O_2 \rightarrow P_3, \ldots O_N \rightarrow P_L\}$. The inspection control module 34 may order the list so as to more efficiently utilize technicians' time and the available UAV equipment. It is noted that one inspection technician may be assigned to multiple properties and, in some implementations or scenarios, multiple inspection technicians may be assigned to the same property. In some implementations and/or scenarios, the inspection control module 34 may consider additional factors when generating the list of provisional assignments, such as whether inspection of a certain property requires mandatory presence of another party and, if so, when this party is available. More generally, in addition to the information obtained at blocks 202 and 204, the inspection control module 34 may consider any suitable combination of factors.

At block 208, the inspection control module 34 may transmit indications of the provisional assignment of inspection technicians to properties to the potential participants. To this end, the inspection control module 34 may use email addresses, phone numbers, etc. to generate automated messages, for example, which may include selectable links to the future online inspection sessions. The inspection control module 34 also may transmit electronic messages to supervisors of the inspection technicians. In an example embodiment, the inspection control module 34 transmits the entire list of properties with provisional operator assignments, generated at block 206, to a supervisor who approves the list in its entirety or partially. Once an indication of approval is received from a user in a supervisory role (condition check 210), the flow proceeds to block 214. Otherwise, the flow proceeds to block 212, where another inspection technician may be selected.

At block 214, an online inspection session may be set up. For example, the inspection control module 34 may create a secure online session using Citrix GoToMeeting™ APIs or any suitable high-level and/or low-level APIs. The inspection control module 34 may configure the meeting to include the video feed from the UAV and video/audio/text input from each of the participants, for example. The inspection control module 34 may also set up a document repository to receive documents, notes, photographs, etc. from the participants. Still further, the inspection control module 34 may set up a comment/message repository to which formal comments from the participants are saved, to be included in the official record of the inspection (see FIG. 3).

In some implementations, the property inspection client module 46 illustrated in FIG. 1, or a similar software component, provides special-purpose controls for participating in an online collaborative inspection session. For example, the property inspection client module 46 may provide a button for submitting a request to reposition the camera of the UAV to inspect a specified portion of the property, a button for submitting a formal comment for the record, a button for submitting a document to the record, etc.

Method 200 may include additional, less, or alternate actions, including those discussed elsewhere herein, and/or may be implemented via a computer system, communication network, one or more processors (such as an insurance customer mobile device and/or a remote server associated with an insurance provider), and/or computer-executable instructions stored on non-transitory storage media or computer-readable medium.

Example Method for Conducting an Inspection Session

Figure 5:
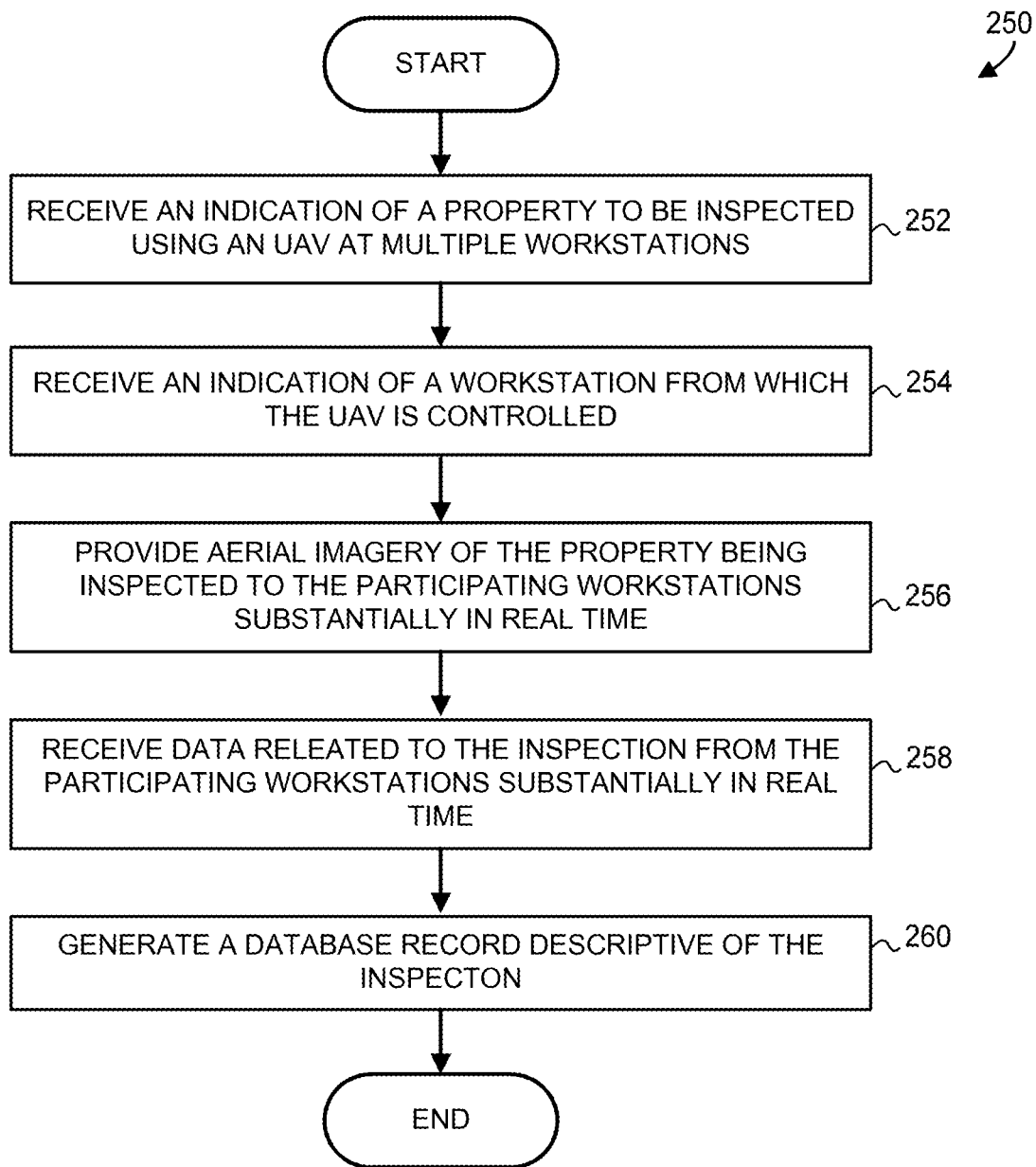
FIG. 5 depicts a flow diagram representing an example computer-implemented method for conducting a collaborative online session in accordance with an example aspect of the present disclosure.

FIG. 5 depicts a flow diagram representing an example method 250 for conducting a collaborative online session. Similar to the method 200, the method 250 may be performed by the inspection control module 34 of FIG. 1. For example, the inspection control module 34 may execute the method 250 to conduct an online session after setting up the session in accordance with the method 200. More generally, the method 250 may be implemented as a set of instructions stored on a non-transitory computer-readable memory and executable on any one or more suitable processors. For convenience, the method 250 is discussed below with reference to the inspection control module 34.

At block 252, an indication of a property to be inspected at multiple workstations using an UAV is received. For example, this indication may be received upon the participants confirming they joined the session, that they agree to the terms of use, etc. Also, as discussed above, the inspection control module 34 may receive an indication that a user in a supervisory role has approved the selection of the inspection technician and the UAV equipment.

At block 254, a message may be received indicative of a workstation from which the UAV will be controlled during the inspection session. More particularly, the inspection control module 34 may receive an indication that the inspection technician operates a particular workstation, so that the inspection control module 34 may configure appropriate privileges for the online session.

At block 256, aerial imagery collected from the UAV may be received at the inspection control module 34 and provided to the participating workstations substantially in real time. In some implementations, the inspection control module 34 may also store the video input in the corresponding inspection record (see FIG. 3), automatically log the time and the appropriate parameters of the camera which the UAV uses to capture the video feed (e.g., position, pitch, yaw, roll), automatically authenticate the video feed to make the record usable in subsequent proceedings, etc.

At block 258, comments, requests, and other data may be received from the participating workstations at the inspection control module 34. In some implementations, the inspection control module 34 automatically distributes the received information to some or all of the participating workstations, substantially in real time. The inspection control module 34 may, for example, determine that a certain comment is being submitted formally for the record, and notifies each participant of the submission. In another instance, the inspection control module 34 may receive a request to reposition the camera of the UAV to view a certain area, and forward the request to the workstation being operated by the inspection technician. In yet another instance, the inspection control module 34 may receive a document to be added to the inspection record. Further, in some implementations, the inspection control module 34 automatically requests description of the property being inspected or a specified portion of the property from each participant. In other words, the inspection control module 34 may require that the participants describe what they see. In other implementations, the inspection control module 34 may automatically suggest that the participants describe what they see without necessarily requiring that such a description be included in the record.

At block 260, the database record may be finalized and saved in a persistent storage, in response to an indication that the online collaborative inspection session has been completed. In some implementations, the participants may indicate completion of the inspection session by activating appropriate controls and/or submitting respective digital signatures. In particular, the participants may formally affirm the results of the inspection and include final comments, if desired.

Method 250 may include additional, less, or alternate actions, including those discussed elsewhere herein, and/or may be implemented via a computer system, communication network, one or more processors (such as an insurance customer mobile device and/or a remote server associated with an insurance provider), and/or computer-executable instructions stored on non-transitory storage media or computer-readable medium.

Example Method for Generating an Inspection Record

Figure 6:
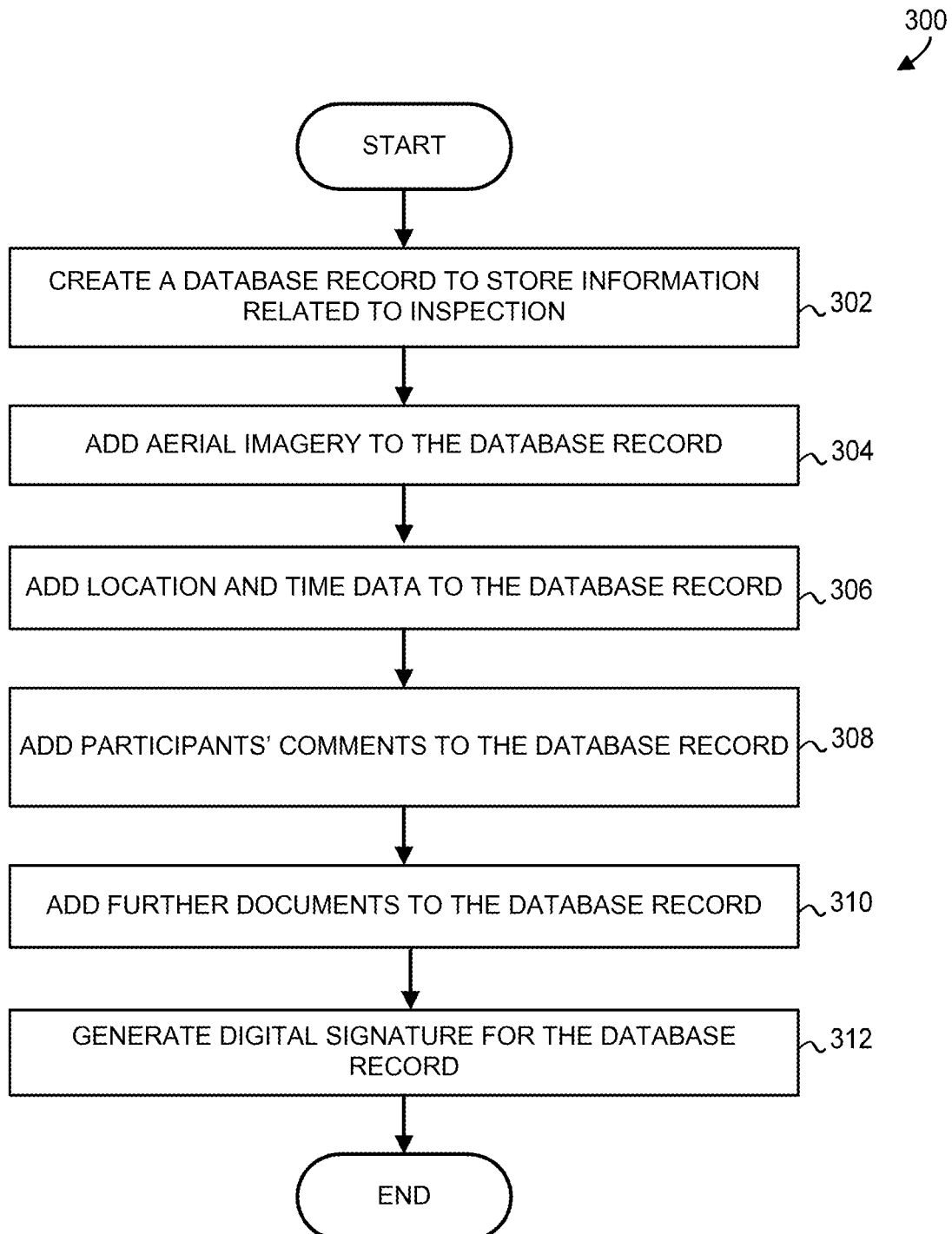
FIG. 6 depicts a flow diagram representing an example computer-implemented method for generating a database record descriptive of an online session in accordance with an example aspect of the present disclosure.

For further clarity, FIG. 6 depicts a flow diagram representing an example computer-implemented method for generating a database record descriptive of an online session, which may be implemented by the inspection control module 34 of FIG. 1, for example.

The method 300 may begin at block 302, where an inspection record may be created in a database to store information related to an online collaborative inspection session. In an example embodiment, the record may include information schematically illustrated in FIG. 3. In general, the inspection record may be distributed among any number of tables, and may conform to any storage/indexing technique. For example, the inspection record may be created in a relational database, where each type of information, such as UAV type, property identifier, or inspection time is stored in a separate table, logically linked by shared indexes.

At block 304, aerial imagery may be added to the database record. The aerial imagery may include video and/or still photography. Location and time data may be added to the database record at block 306. For example, a location/time stamp may specify from where, and at what time, a certain image was captured. At block 308, participants' comments may be added to the inspection record. Further documents, which may conform to any desired format, may be added to the inspection record at block 310. A generated signature may be appended to the database record at block 312 to prevent alterations by unauthorized parties after the inspection. Blocks 304-310 may be executed in any order, and any necessary number of times during an inspection session. For example, users may submit multiple comments and multiple documents as new video data is added to the inspection record.

Method 300 may include additional, less, or alternate actions, including those discussed elsewhere herein, and/or may be implemented via a computer system, communication network, one or more processors (such as an insurance customer mobile device and/or a remote server associated with an insurance provider), and/or computer-executable instructions stored on non-transitory storage media or computer-readable medium.

Example Method for Generating an Inspection Record

Figure 7:
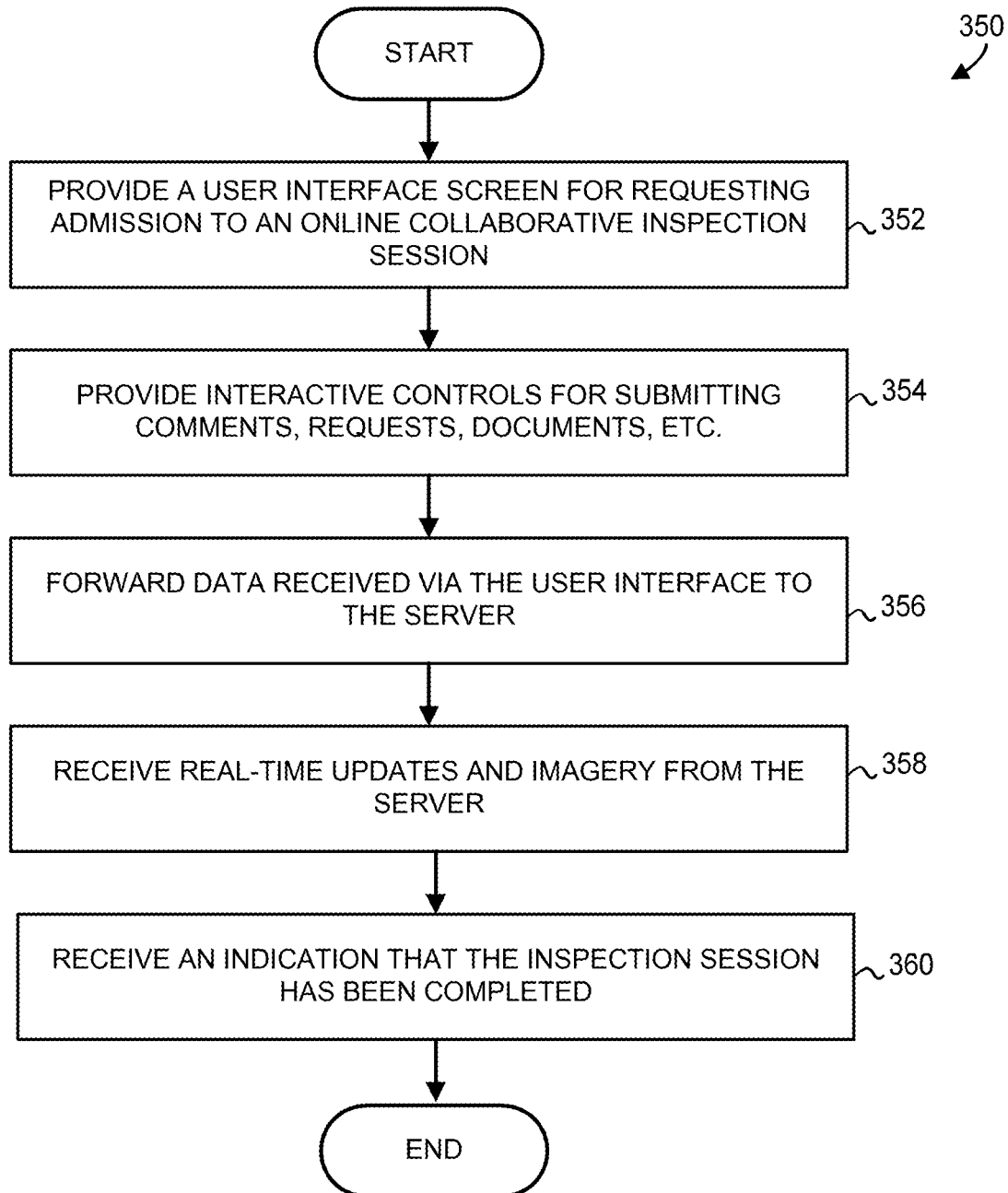
FIG. 7 depicts a flow diagram representing an example computer-implemented method for facilitating an online collaborative inspection session at a workstation in accordance with an example aspect of the present disclosure.

FIG. 7 depicts a flow diagram representing an example computer-implemented method for facilitating an online collaborative inspection session at a workstation in accordance with an example aspect of the present disclosure. The method 350 may be implemented in the property inspection client module 36 depicted in FIG. 1, for example. More generally, the method 350 may be implemented as a set of instructions executable on one or more processors of any suitable computing device.

The method 350 begins at block 352, where a user interface screen for requesting admission to an online collaborative inspection session may be provided. This screen may be displayed in response to the potential participant clicking on a URL that includes a link to the online session. Next, at block 354, interactive controls may be provided for submitting comments requests, documents. As discussed above, these controls may be provided in the form of buttons, for example. At block 356, data received from the participant via the user interface may be forwarded to the appropriate server, such as the server 12 depicted in FIG. 1, for example. The data may be forwarded to the server substantially in real time.

Accordingly, at block 358, data may be received also substantially in real time from the server. The data may include aerial imagery currently being captured by the UAV, as well as comments and documents forwarded to the server from other workstations. It is noted that blocks 356 and 358 may be executed in any order and multiple times during an inspection session. At block 360, an indication that the inspection has been completed may be received, and the method 350 completes.

Method 350 may include additional, less, or alternate actions, including those discussed elsewhere herein, and/or may be implemented via a computer system, communication network, one or more processors (such as an insurance customer mobile device and/or a remote server associated with an insurance provider), and/or computer-executable instructions stored on non-transitory storage media or computer-readable medium.

Example Insurance Applications

The present UAV System may dramatically advance the property loss adjustment process in many ways, from inspection through settlement. In one aspect, the UAV System may not replace in-person, on-site inspections. Rather, it may build upon them and provide up to real time data to centralized operations for completing claim settlements.

The fundamental operations of UAV System may entail: (a) specialized personnel conducting on-site, UAV-assisted inspections (for these purposes, they may be referred to as "Inspection Technician" or "Technician"); (b) a centralized operation may assign the Inspection Technician a sequence of properties to inspect according to geography and possibly other factors (preferably, each assignment may include current information about the property, e.g., type of construction, cladding, number of stories, and dimensions, etc.); (c) a Planned Inspection Sequence; and/or (d) carriers to facilitate the UAV transporting itself from a remote location.

Redundancy may be built into one or more of the operations discussed herein. Most or all UAV operations may be provided with the option of direct control, such as by a licensed drone operator, which functionality may be backed up by remote control from a centralized operation, such as an insurance provider location or remote server.

The present embodiments may provide numerous purposes and benefits. For instance, (1) enhanced customer satisfaction may be provided. First, a video record of an entire structure, damaged and undamaged, close-up and at a distance of all exterior surfaces. Insurance customer and representatives may be able to access and "see" what the insurance provider sees or has access to. Drone data may be available instantly by feed to customer/representative mobile device, or shortly after inspection via a DVD or CD left on-site, and soon thereafter on an insurance provider secure website.

Second, real-time remote participation may diminish customers' need/preference to be present, especially because of immediate documentation for them. Also, both the insurance customer and insurance provider may enjoy less time and fewer problems associated with communication coordinating schedules.

Third, on-site second inspections may become very rare exceptions. Public adjusters generally may not need to inspect on-site. Again, they may have remote access to the same data as the insurance provider. This feature may further streamline the damage estimate reconciliation process. These benefits may apply equally to internal re-inspection for quality and training.

Fourth, ultimately, reduced adjustment cost may also reduce indicated rates and premiums. Thus, overall insurance cost savings may be provided to insurance customers as a whole, as well as enhance the overall customer experience.

Another benefit of the present embodiments may be improved accuracy of insurance claim settlements. For instance, video documentation of the complete insured structure or property may aid damage assessment. The continuous video of the total structure may be segmented and labelled, e.g., "close-up of left elevation damage." That digital or other video segmentation may be both faster and more accurate than selected photo documentation.

Increased efficiency may also result. For example, inspection time may be greatly reduced by eliminating the need for manual inspection, reducing average time to prepare a damage estimate and pay a claim, and requiring fewer specialized personnel. Also, reduced travel costs may be achieved by requiring fewer on-site personnel due to (i) increased inspections per day; and/or (ii) increased task centralization. More centralized tasks may reduce adjuster travel expenses. Efficiencies may be gained by (a) reduced inspection times; and/or (b) the feasibility of co-occurring inspections of proximate properties in multi-loss occurrences (such as due to a major weather event, e.g., hurricane or high water).

Benefits associated with employee safety may also be provided by the present embodiments. Very courageous damage inspectors may accept much physical risk to inspect structural property damage with conventional techniques, most pointedly with roof inspections. The new tools provided by the present embodiments may operate in a fashion so as to not put them in harm's way, and provide a remote control inspection tool, a UAS, with which they may effectuate complete, even more complete than now possible, inspections of insured structures claimed to have insured damage. Insurance provider employees may be able to document better than ever before the state of the insured structure as to which damages are claimed without endangering themselves by climbing ladders, or, as to large, complicated structures employing climbing harnesses.

In one embodiment, a drone or UAV may be provided with the following specifications. First, a weight of no more than 30 pounds, so that any mishaps that may unfortunately occur, may cause only minimal damage to person and property. Also, the drone or UAV may be programmed with flight technology that likewise limits risk. So-called helicopter applications are presently the state of the art, but other "propulsion" technologies may also be used, such as magnetic field control. Locational remote control may be utilized, meaning that the operator is visually connected to the drone or UAV, on location, not remotely. Also, the control of the device may be limited in distance to the perimeter of the property being examined. In other words, the device or drone may automatically drop to the ground in a controlled descent if it exceeds the defined perimeter.

The preferred drone or UAV may also have high definition cameras both on top and bottom of its frame. Both cameras may have a 360° range (of view and/or image gathering capability). For instance, the bottom camera may capture the top of the house, i.e., images of the roof and roofing materials/shingles. And, more significantly, may capture the dimensions of the structure (or house) to guide the flight of the drone or UAV around the structure in a controlled flight to facilitate the complete documentation of the exterior of the structure. To be more specific, the drone or UAV may initially assess the dimensions and physical aspects of the structure, and with computer-executable instructions may define its flight pattern around the structure, recording high resolution video throughout its flight.

Also, any obstacles in the vicinity of the home, such as vehicles, trees, bushes, fences, etc., may be determined from computer analysis of the image data acquired by the UAV, and the flight path may be adjusted to account for, and/or avoid, the obstacles detected. The UAV processors or controller may also use GPS (Global Positioning System) information acquired from a GPS unit mounted on the drone, and/or elevation information acquired from an altimeter mounted on the drone to calculate and/or refine the flight path.

One purpose of the lower, underside, camera up may be to document the lower side of the house, i.e., the siding, the façade, etc., that may not be achieved with a top-sided camera with some drones and/or some flight plans. In some embodiments, a single lower camera, mounted on the bottom of the drone or UAV, may be programmed to accomplish both tasks. However, in some embodiments, two may be preferable.

Example Roof

Figure 8:
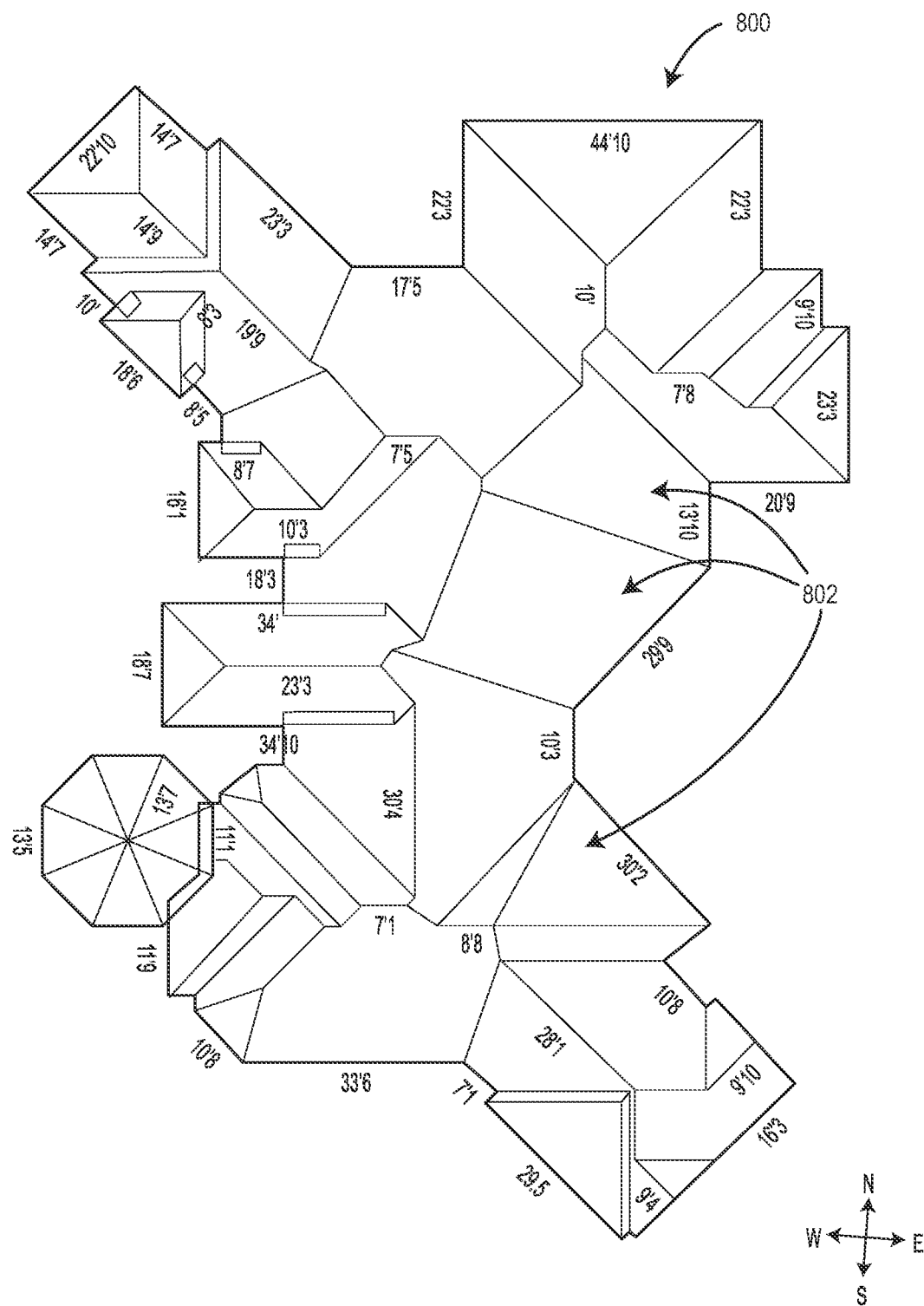
FIG. 8 depicts an example roof of an insured property for which the present embodiments may estimate size of, and/or damage thereto.

Although the discussion below concerns primarily roofs, the techniques of this disclosure in general allow automatic collection of imagery related to an entire home to create an irrefutable, self-authenticating record of an inspection. For example, drones or UAVs also may collect images of exterior walls and other exterior surfaces (substantially parallel to the ground, substantially perpendicular to the ground, slanted relative to the ground), structures external to the home, etc., and other unmanned or remote-controlled devices can collect interior imagery. In short, the FIG. 8 depicts a roof of an example insured home 800. The present embodiments may use aerial imagery data generated or collected by drones or UAVs for a number of insurance-related purposes. The drone aerial imagery data may be used to estimate, via computer analysis of the data, several insured property characteristics, including the slope, dimensions, length, and/or size of several roof segments 802. The drone aerial imagery data also may be used to identify the type of roofing and shingles, and/or the manufacturer of the shingles or other roofing materials. The drone aerial imagery data also may be used to identify a number of stories for the insured property and/or structural characteristics thereof.

After the characteristics of the insured property 800 are determined from computer analysis of the drone aerial imagery data, the characteristics (e.g., size of roof, type of roofing material, condition of roof, estimated damage to the insured home) may be used to generate a premium or discount for a new insurance policy covering the insured property 800, update a premium or discount for an existing insurance policy covering the insured property 800, estimate an insurance claim for the insured property 800, estimate a replacement or repair cost for the insured property 800, and/or handle insurance claims associated with an insurance policy covering the insured property 800.

Example Insurance-Related Purposes

Figure 9:
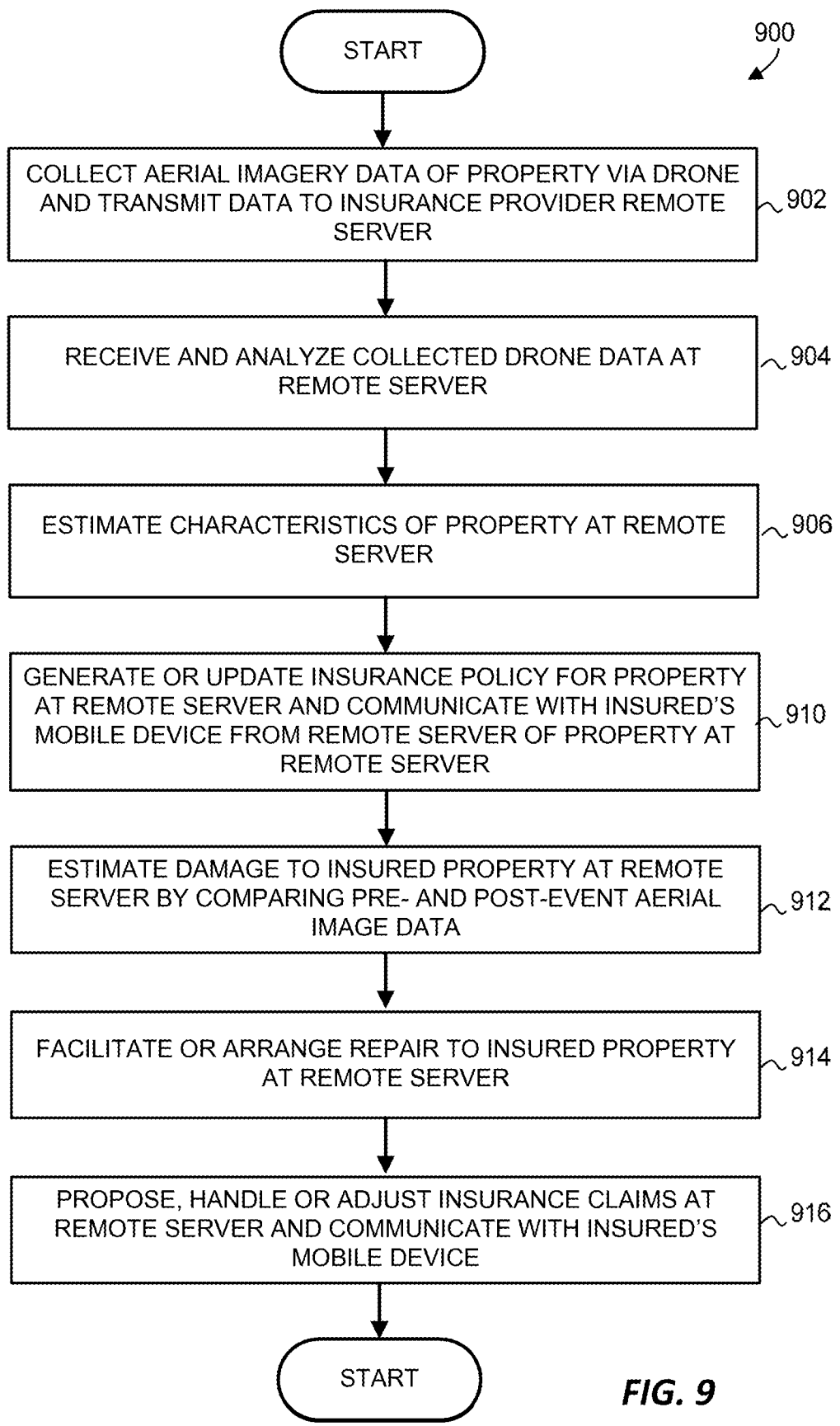
FIG. 9 depicts an example computer-implemented method of using aerial imagery data captured by drones for insurance-related purposes.

FIG. 9 depicts an example computer-implemented method of using aerial imagery data captured by drones for insurance-related purposes 900. The method 900 may include collecting aerial imagery data of a property via a drone or UAV, and transmitting the data to a remote server 902; analyzing the data at the remote server 904; estimating characteristics of the property at the remote server 906; generating or updating an insurance policy for the property at the remote server and communicating the insurance policy to an insured's mobile device 908; collecting aerial imagery data of the insured property via a drone after an insurance-related event, and transmitting the post-event data to the remote server 910; estimating damage to the insured property at the remote server 912; facilitating or directing repair to the insured property via the remote server 914; and/or proposing, handling, or adjusting an insurance claim at the remote server 916. The method may include additional, less, or alternate actions, including those discussed elsewhere herein, and/or may be implemented via one or more processors, such as drone mounted processors, mobile device processors, and/or remote servers or processors associated with an insurance provider.

The method 900 may include collecting or generating aerial imagery data of a property via a drone or UAV 902. After which, the drone may include a transceiver that is configured to transmit the data to an insurance provider remote server via wireless communication or data transmission. The drone may be operated to capture image data of a roof and/or walls of a property, and may reveal several structural features of the property. In the case of a home, the data may reveal type of roofing; condition of roofing; slope, size, dimensions, etc. of each roof segment; number of floors; total roof area; total roof facets; GPS coordinates of the property; type, size, and/or condition of the yard; number and size of trees; etc.

The method 900 may include analyzing the aerial image data at the remote server 904. For instance, the remote server may perform computer analysis of the data generated by the drone, such as using various computer algorithms or known computer techniques on the data collected/received from the drone. The computer analysis of the aerial image data may result in or allow the remote server (and/or other processor(s)) to estimate various characteristics of the property 906. In the case of a home, the computer analysis of the data may be used by a processor to estimate or determine a type of roofing or roofing material; condition of roofing; age of roofing; slope, size, dimensions, etc. of each roof segment; number of floors; total roof area; total roof facets; type, size, and/or condition of the yard; number and size of trees; etc.

The method 900 may include generating or updating an insurance policy for the property at the remote server and communicating the insurance policy to an insured's mobile device 908. Based upon the characteristics of the property determined from computer analysis of the drone data collected, a premium or discount for a new insurance policy covering the home (or other property) may be generated by the remote server, or an updated premium or discount for an existing insurance policy covering the home may be generated. The new or updated insurance policy and/or premium/discount may then be communicated to the home owner or insured, such as via wireless communication or data transmission from an insurance provider remote server to the insured's mobile device.

The method 900 may include collecting or generating aerial imagery data of the insured property via a drone after an insurance-related event, and transmitting the post-event data to the remote server 910. The insurance-related event may cause damage to the insured property, such as fire, water, wind, hurricanes, tornadoes, storm surge, flash flooding, hail, catastrophes, or weather events.

The post-event drone data may be used to estimate damage to the insured property at the remote server 912. For instance, the remote server may compare, such as via various software applications or algorithms, pre-event drone data (or other baseline data) with the post-event (or current home condition) to estimate an amount of damage caused to the insured home by the insurance-related event, and/or a cause of the damage, such as wind, water, or hail. The remote server may identify a type of roofing or shingle material that was damaged, an amount of size of the damaged area, an amount and/or type of replacement roofing or shingle materials to repair the damage to the home, and/or a cost of repairing the damage.

The method 900 may include facilitating or directing repair to the insured property via the remote server 914. Based upon the location of the insured home; the availability, qualifications, and/or experience of contractors (such as by searching contractor information stored in a database accessible by the remote server); the type and amount of replacement materials; and/or the extent of damage the insurance provider may schedule repair work for the insured (with their permission), and/or communicate the insured's best options for having the repair work timely and properly completed (such as via wireless communication with their mobile device).

The method 900 may include proposing, handling, and/or adjusting an insurance claims at the remote server 916. For instance, an insurance claim submitted by an insured may be adjusted based upon the post-event drone date showing actual damage to the insured property. As a result, accurate insurance claim handling may be facilitated. Also, based upon the post-event drone date, the remote server may generate a proposed insurance claim, and transmit the proposed insurance claim to the insured's mobile device for their review, modification, and/or approval.

Example Claim Adjustment Workflow Using Aerial Inspections

For further clarity, FIGS. 10-15 depict diagrams of an example workflow. As used in these diagrams, the term "I.O" refers to inspection operator, "C.E." refers to centralized structure estimator, and "C.O." refers to centralized contents operator. Further, the "set point" is the point from which, and to which, internal flight settings are circulated. The set point is analogous to the start/end point in land surveys. A data collection flight from the set point controlled by the inspection operator ("IO") collects flight data by which the UAV will fly itself and record the entire structure. The structure dimensions are calculated by the UAV or by the I.O.'s handheld device. The data collected can be shared in real time with fire underwriter's risk record, for update and comparison of existing and newly-collected risk characteristics.

In FIGS. 10-15, steps can be executed sequentially, with the steps, events, or resources depicted higher on the page executed prior to the steps depicted lower down on the page. Some steps, however, can be executed concurrently. Further, it is noted that the sequence of some of the steps can be modified in alternate embodiments.

Figure 10:
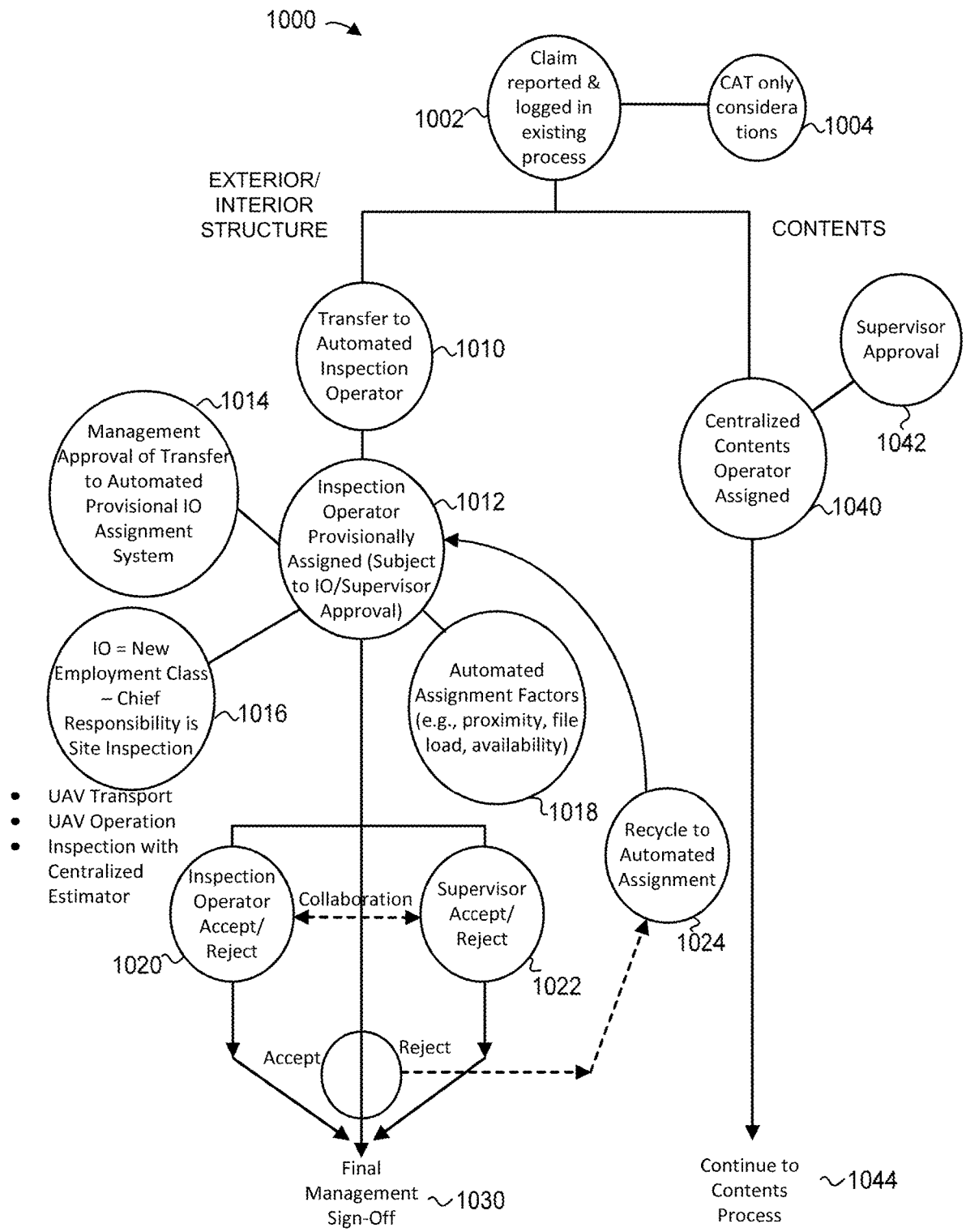
FIGS. 10-15 depict workflow diagrams of a claim adjustment process that includes aerial inspections.

More particularly, FIG. 10 illustrates initial assignment of a claim and transfer to automated inspection operator for the purposes of inspecting exterior and interior structures, as well as assignment of a centralized contents operator. Step 1002 corresponds to a claim being reported logged in an existing process. Catastrophe (CAT)-only considerations are processed at step 1004.

Referring first to the "exterior/interior structure" branch, transfer to an automated inspection operator occurs at step 1010. An inspection operator may be provisionally assigned at step 1012, subject to supervisor approval. Step 1012 may be associated with additional events such as management approval of transfer to automated provisional inspector operator assignment system (1014). Step 1012 may also be associated with resource 1016, corresponding to the inspection operator as a new employment class, with the chief responsibility being site inspection. Further, step 1012 may be associated with automated assignment factors, such as proximity, file load, availability, etc. (1018). Inspection operator acceptance or rejection, and supervisor acceptance or rejection, occur at steps 1022 and 1022, respectively. Final management sign-off occurs at step 1030. Otherwise, if the rejection occurs, recycling to automated assignment occurs at step 1024, and the flow returns to step 1012. In the "contents" branch, a centralized contents operator is assigned at step 1040, and supervisor approval is obtained at step 1042.

Figure 11:
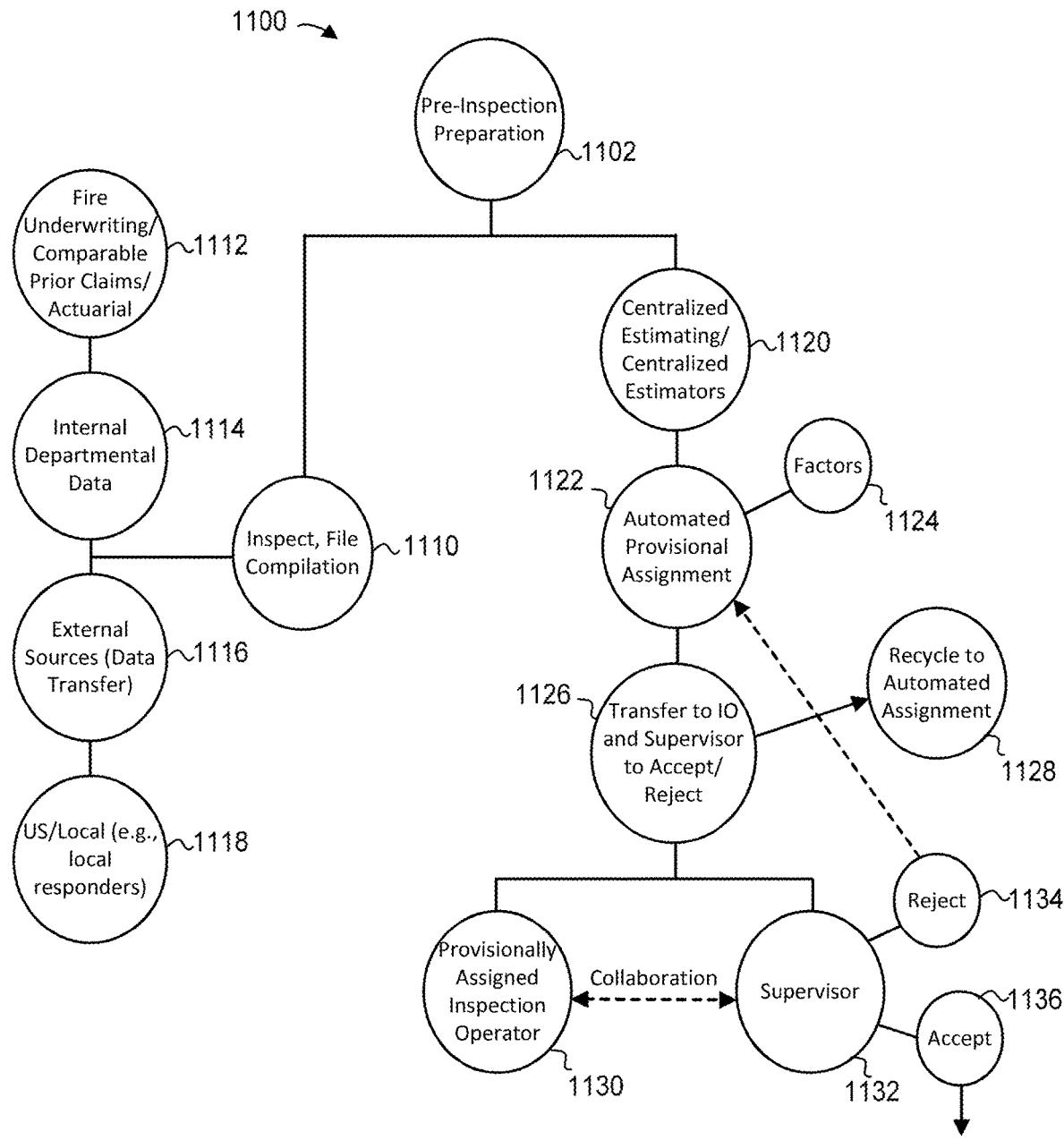

Next, FIG. 11 illustrates some of the stages of pre-inspection preparation, including file compilation and automated provisional assignment. Pre-inspection preparation may occur at step 1102. In some cases, pre-inspection preparation can include a pre-inspection flight to capture dimensional data to facilitate and delimit a subsequent UAV inspection. File compilation may be conducted at step 1110, which may be associated with such considerations as fire underwriting, comparable prior claims, actuarial data (1112), internal department data (1114), data transfer (1116), and US/local (e.g., local responders (1118).

Step 1120 corresponds to centralized estimating by one or several centralized estimators. Automated provisional assignment may occur at step 1122 in view of various factors (1124), and the potential inspection may be transferred to an inspection operator and his or her supervisor for acceptance or rejection (1126). Failure to transfer results in recycling to automated assignment (1128). Otherwise, a provisionally assigned inspection operator may then work in collaboration with a supervisor (1130, 1132) to accept (1136) or reject (1134) the potential inspection. Upon a rejection, the flow may return to step 1122 for a new automated provisional assignment.

Figure 12:
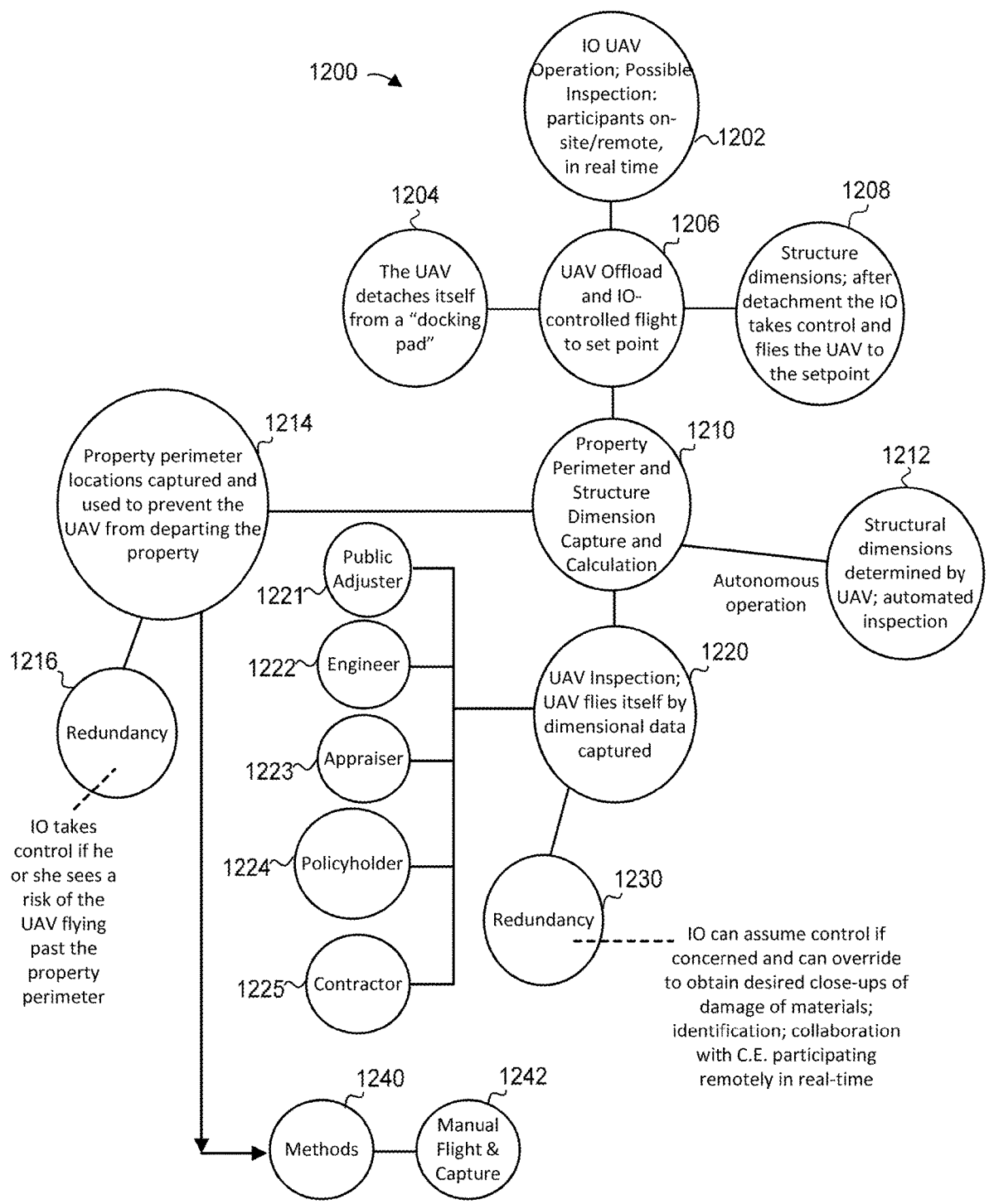

FIG. 12 illustrates some of the early stages of an aerial inspection supervised by an inspection operator. Step 1202 corresponds to operation of an UAV by an inspection operator. Possible inspection may include on-site as well as remote participants, participating in real time. The UAV detaches itself from a docking pad at step 1204, is off-loaded at step 1206, and proceeds to a set point under the control of an inspection operator to inspect structure dimensions at step 1208. In some of the embodiments, the UAV may be ground-transported to the structure and configured (programmatically and/or manually) to remain within specified boundaries, as determined by GPS coordinates or using other positioning techniques. Property perimeter and structure dimensions are captured and calculated at step 1210. As part of autonomous operation, the UAV may determine structural dimensions and perform some of the inspection automatically at step 1212. Property perimeter locations may be captured and used to prevent the UAV from departing the property at step 1214. This step may be carried out autonomously, but redundancy may be ensured at step 1216 by an inspection operator taking control if he or she seeks a risk of the UAV flying outside the perimeter of the property. Also, various methods (1240) may be employed at this point and a switch-over to manual flight and capture (1242) may occur.

Inspection by an UAV takes place at step 1220, when the UAV guides itself using the previously captured dimensional data. At least the following participants may participate in the inspection in real time, at this step: a public adjuster (1221), an engineer (1222), an appraiser (1223), a policyholder (1224), and/or a contractor (1225). To provide redundancy, the inspection operator may assume control of the UAV whenever he or she is concerned (1230). When necessary, he or she also can override the autopilot to obtain closer-ups of damage or materials. Collaboration with a centralized estimator in real time also is possible at this time.

Figure 13:
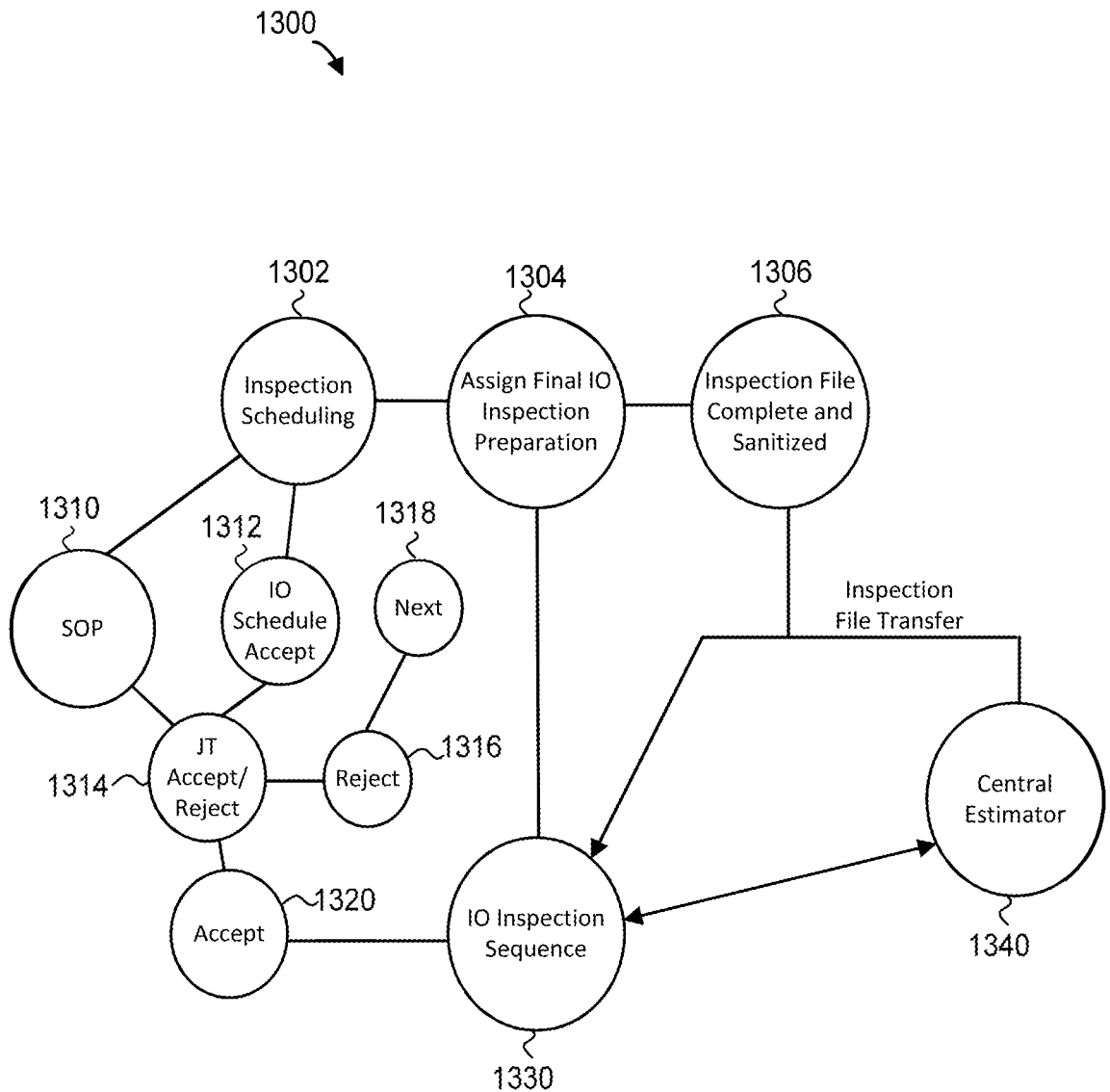

FIG. 13 illustrates some of the stages of inspection scheduling and inspection file compilation. Inspection scheduling takes place at step 1302. Assignment of final IO inspection preparation may occur at step 1304, and the inspection file is completed and "sanitized" at step 1306. Steps/items related to the inspection scheduling at step 1302 may include standard operating procedure (1310), IO schedule acceptance (1312), and possible iteration through candidates (rejection, acceptance, considering the next candidate at steps 1314-1320). Referring again to step 1306, inspection file transfer may be related to inspection sequence (1330) and/or a central estimator (1340).

Figure 14:
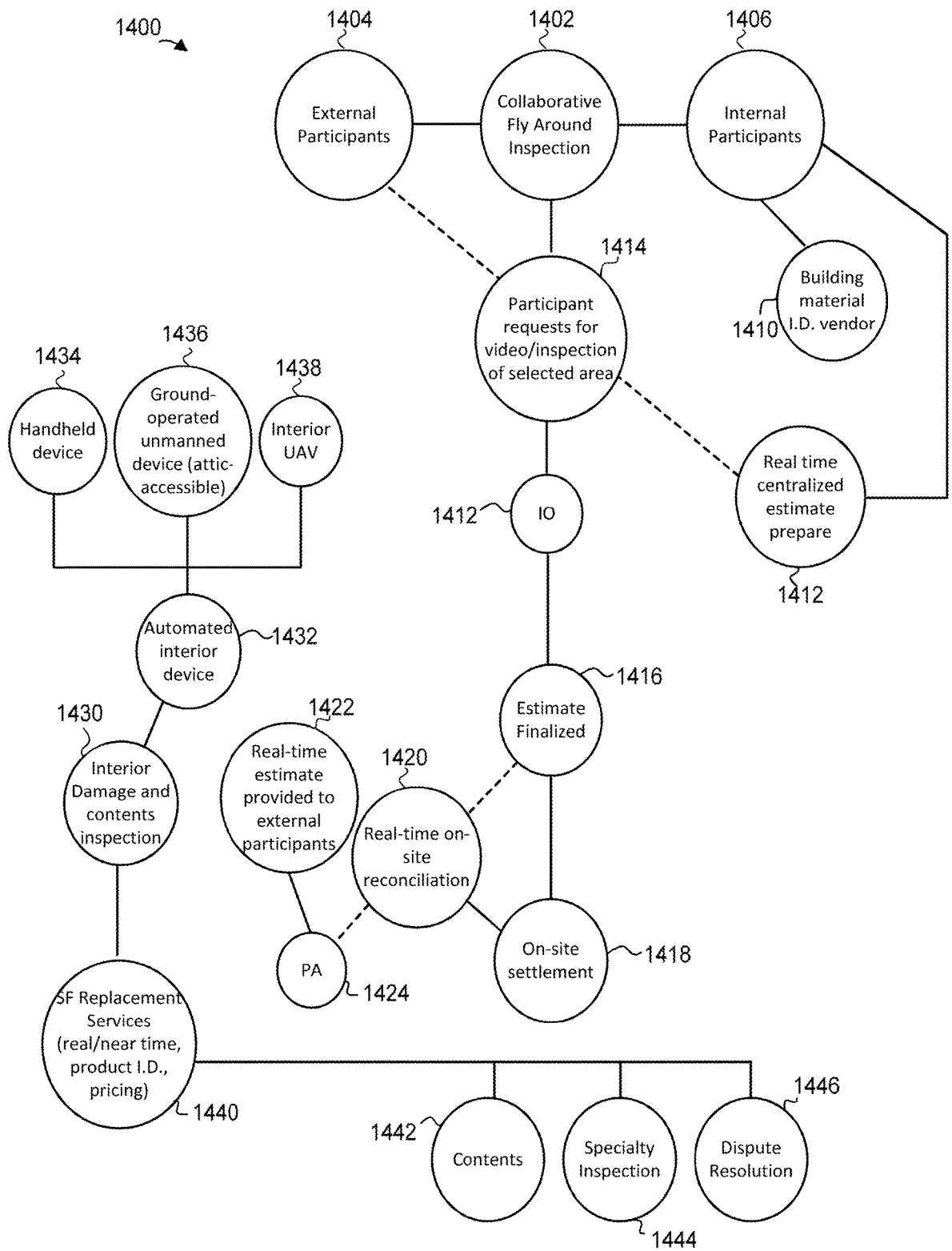

FIG. 14 illustrates some of the stages of a collaborative fly-around inspection and generation of an estimate, including an on-site settlement in some cases. A collaborative fly-around inspection begins at steps 1402 with external participants 1404 and internal participants 1406. The vendor of building materials may also be identified at step 1410. Participants' requests for video and/or inspection of a selected area may be received at step 1408. A real-time centralized estimate may be prepared at step 1412 with the participation of external and internal participants.

An inspection operator may control the inspection at step 1414, until the estimate is finalized at step 1415. An on-site settlement may take place at step 1418, and a real-time on-site reconciliation may take place at step 1420. A real-time estimate may be provided to external participants at step 1424.

Regarding the inspection, an interior damage and contents inspection may occur at step 1430. To this end, an automated inspection may be conducted at step 1432 using a handheld device (1434), a ground-operated unmanned device, which may be capable of accessing the attic (1436), and/or an interior UAV (1438). Replacement services may be considered at step 1440, and may include real or near-real-time pricing, product identification, etc. This may be associated with contents (1442), a specialty inspection (1444), and dispute resolution (1446).

Figure 15:
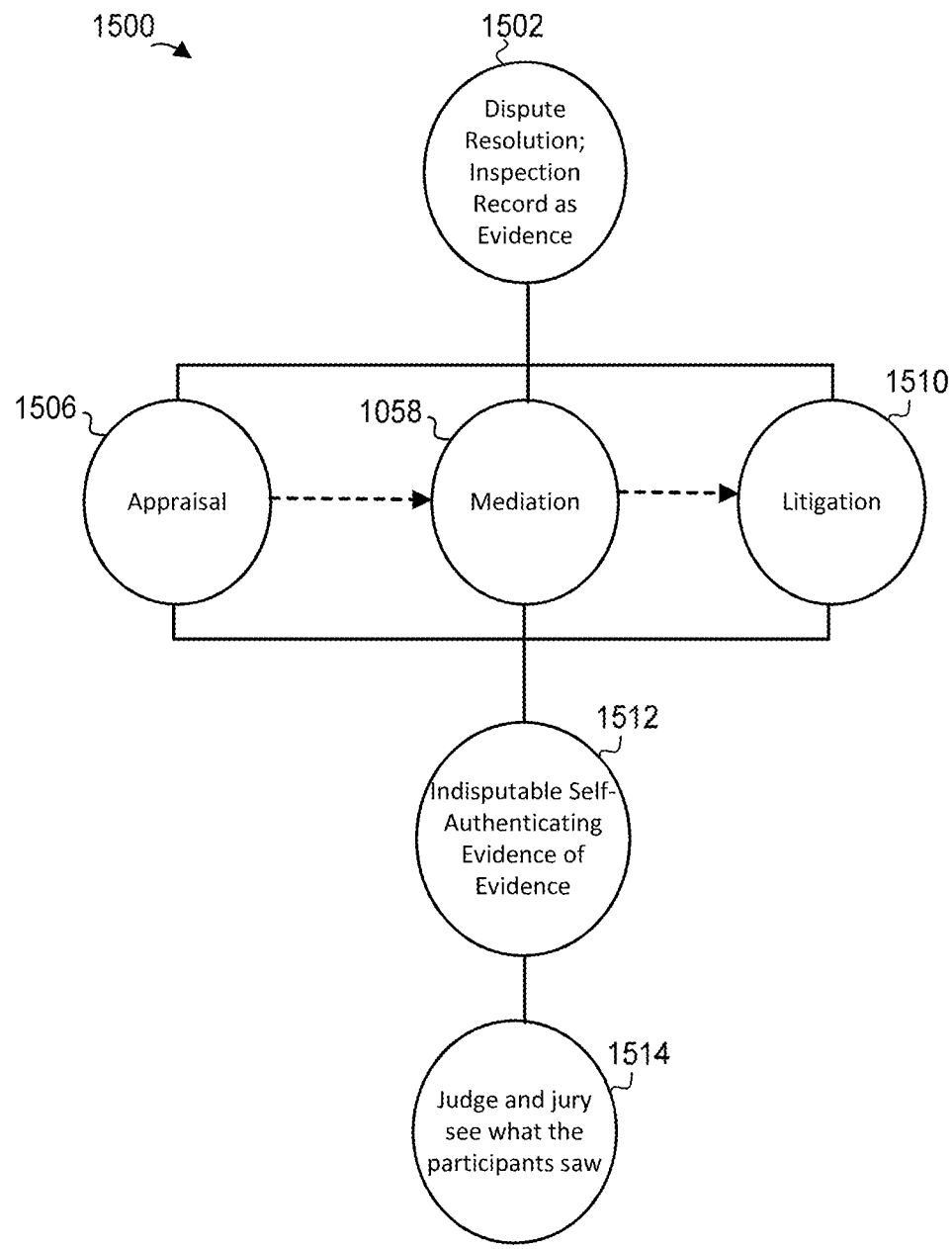

Finally, FIG. 15 illustrates some of the stages of dispute resolution using the results of an aerial inspection as self-authenticating evidence. Dispute resolution, using inspection record as evidence, may be conducted at step 1502. This step may be associated with appraisal (1506) followed by mediation (1508), and further followed by litigation (1510). Indisputable, self-authenticating evidence of damage may be used at step 1512, so that the judge and jury may see what the participants saw, when necessary (1514).

The computer-implemented methods and workflows of FIGS. 10-15 may be implemented via one or more local or remote processors, and/or via computer-readable instructions stored on non-transitory computer-readable medium or media.

Example Insurance Policy Adjustment Based Upon Roof Images

In one aspect, a computer-implemented method for using drone data for insurance purposes and/or inspection or insuring properties may be provided. The method may include (1) receiving via wireless communication or data transmission, at or via one or more processors (such as at an insurance provider remote server), aerial data of a property (such as a home or other building), the aerial data being generated, collected, or captured via one or more cameras mounted on a drone, the aerial data further being transmitted from a transceiver mounted on the drone either directly or indirectly to the one or more (remotely located) processors; (2) estimating, at or via the one or more processors, a total roof area for the property via computer analysis performed on the aerial data received from the drone; (3) determining, at or via the one or more processors, a type or current condition of shingles or other roofing materials for the property via computer analysis performed on the aerial data received from the drone; (4) generating or updating, at or via the one or more processors, an insurance premium or discount for an insurance policy covering the property based upon (i) a total roof area for the property, and/or (ii) type or current condition of shingles or other roofing materials for the property determined via computer analysis performed on the aerial data received from the drone; and/or (5) transmitting, under the direction or control of the one or more processors, the insurance premium or discount for the insurance policy covering the property to a mobile device of the insured or home owner for their review, modification, or approval. The method may include additional, less, or alternate actions, including those discussed elsewhere herein.

For instance, the method may include (a) identifying, at or via the one or more processors, multiple roof segments of a roof of the property via computer analysis performed on the aerial data received from the drone; and/or (b) estimating, at or via the one or more processors, a slope, size, and/or dimension of each of the multiple roof segments via computer analysis performed on the aerial data received from the drone. The method may include estimating, at or via the one or more processors, damage to one or more of the multiple roof segments of the roof of the property via computer analysis performed on aerial data generated or collected by a drone after an insurance-related event that has caused damage to the property.

The method may include estimating, at or via the one or more processors, a cost to repair the damage to the one or more of the multiple roof segments of the roof of the property via computer analysis performed on the aerial data generated or collected by a drone after an insurance-related event; and/or transmitting, under the direction or control of the one or more processors, the estimated damage and/or estimated cost to repair the damage to the mobile device of the insured or home owner for their review. Additionally or alternatively, the method may include estimating, at or via the one or more processors, damage to the roof of the property via computer analysis performed on aerial data generated or collected by a drone after an insurance-related event that has caused damage to the property, such as the one or more processors comparing pre-event drone (or aerial image) data with post-event drone (or aerial image) data.

Example Damage Assessment from Post-Event Image Data

In one aspect, a computer-implemented method for using drone data for insurance purposes and/or inspection or insuring properties may be provided. The method may include (1) receiving via wireless communication or data transmission, at or via one or more processors (such as at an insurance provider remote server), post-event aerial data of a property (such as a home), the post-event aerial data being generated, collected, or captured via one or more cameras mounted on a drone after an insurance-related event has caused damage to the property, the post-event aerial data further being transmitted from a transceiver mounted on the drone either directly or indirectly to the one or more (remotely located) processors; (2) storing, via the one or more processors, the post-event aerial data of the property generated by the drone in a non-transitory memory unit for subsequent access by the one or more processors; (3) retrieving, via the one or more processors, the post-event aerial data, as well as pre-event aerial data, from the non-transitory memory unit (or otherwise accessing the post-event and pre-event aerial data), the pre-event aerial data being of, or associated with, the property prior to the insurance-related event happening; (4) comparing, via the one or more processors, the post-event aerial data and the pre-event aerial event to (i) estimate damage to the property caused by the insurance-related event; (ii) estimate a cost of repairing the damage to the property or replacing damaged items on the property; (iii) determine or estimate an amount and/or type of replacement or repair materials (such as an amount or type of replacement shingles or other roofing materials); and/or (iv) estimate an insurance claim for an insured or owner of the property for their review and/or approval; and/or (5) transmitting, under the direction or control of the one or more processors, (i) the estimated damage; (ii) estimated cost of repair; (iii) estimated amount or type of replacement/roofing materials; and/or (iv) estimated insurance claim to a mobile device associated with the insured or owner of the property for their review, modification, and/or approval. The method may include additional, less, or alternate actions, including those discussed elsewhere herein.

For instance, the method may include (a) estimating, at or via the one or more processors, a total roof area for the property via computer analysis performed on the pre-event or post-event aerial data received from the drone; (b) determining, at or via the one or more processors, a type or current condition of shingles or other roofing materials for the property via computer analysis performed on the pre-event or post-event aerial data received from the drone; (c) generating or updating, at or via the one or more processors, an insurance premium or discount for an insurance policy covering the property based upon (1) a total roof area for the property, and/or (2) type or current condition of shingles or other roofing materials for the property determined via computer analysis performed on the pre-event or post-event aerial data received from the drone; and/or (d) transmitting, under the direction or control of the one or more processors, the insurance premium or discount for the insurance policy covering the property to a mobile device of the insured or home owner for their review, modification, and/or approval.

The method may include identifying, at or via the one or more processors, multiple roof segments of a roof of the property via computer analysis performed on the pre-event and/or post-event aerial data received from the drone; and/or estimating, at or via the one or more processors, a slope, size, and/or dimension of each of the multiple roof segments via computer analysis performed on the pre-event and/or post-event aerial data received from the drone.

The method may include estimating, at or via the one or more processors, damage to one or more of the multiple roof segments of the roof of the property caused by a weather event (such as wind or hail) or other insurance-related event via computer analysis performed on post-event aerial data generated or collected by a drone after an insurance-related event that has caused damage to the property. Additionally or alternatively, the method may include estimating, at or via the one or more processors, a cost to repair the damage to the one or more of the multiple roof segments of the roof of the property via computer analysis performed on the post-event aerial data generated or collected by a drone after an insurance-related event; and/or transmitting, under the direction or control of the one or more processors, the estimated damage and/or estimated cost to repair the damage to a mobile device of an insured or home owner for their review.

The method may also include estimating or identifying, at or via the one or more processors, damage to a roof of the property via computer analysis performed on post-event aerial data generated or collected by a drone after an insurance-related event that has caused damage to the property, such as the one or more processors comparing pre-event drone (or aerial) data with the post-event drone (or aerial) data.

Example Determination of Property Characteristics

In one aspect, a computer-implemented method for using drone data for insurance purposes and/or inspection or insuring properties may be provided. The method may include (1) receiving via wireless communication or data transmission, at or via one or more processors (such as at an insurance provider remote server), pre-event aerial data of a property (such as a home or other building), the pre-event aerial data being generated, collected, or captured via one or more cameras mounted on a drone prior to an insurance-related event that causes damage to the property, the pre-event aerial data further being transmitted from a transceiver mounted on the drone either directly or indirectly to the one or more processors; (2) storing, via the one or more processors, the pre-event aerial data of the property generated by the drone in a non-transitory memory unit for subsequent access by the one or more processors; (3) retrieving, via the one or more processors, the pre-event aerial data from the non-transitory memory unit (or otherwise accessing the pre-event aerial data), the pre-event aerial data being of or associated with the property prior to the insurance-related event happening; (4) identifying, via the one or more processors, multiple property characteristics from computer analysis of the pre-event aerial data, the multiple property characteristics including (a) a total roof area for the property, and/or (b) type or current condition of shingles or other roofing materials of a roof of the property determined via computer analysis performed on the pre-event aerial data received from the drone; (5) generating or updating, via the one or more processors, an insurance premium or discount for an insurance policy covering the property based upon the multiple property characteristics identified via computer analysis performed on the pre-event aerial data received from the drone; and/or (6) transmitting, under the direction or control of the one or more processors, the insurance premium or discount for the insurance policy covering the property to a mobile device (such as via wireless communication or data transmission) of the insured or home owner for their review, modification, and/or approval. The method may include additional, less, or alternate actions, including those discussed elsewhere herein.

For instance, the method may include (a) receiving via wireless communication or data transmission, at or via one or more processors (such as at an insurance provider remote server), post-event aerial data of a property (such as a home or other building), the post-event aerial data being generated, collected, or captured via one or more cameras mounted on a drone after an insurance-related event has caused damage to the property, the post-event aerial data further being wirelessly transmitted from a transceiver mounted on the drone either directly or indirectly to the one or more (remotely located) processors; (bi) comparing, via the one or more processors, the post-event aerial data and the pre-event aerial event to (1) estimate damage to the property caused by the insurance-related event; (2) estimate a cost of repairing the damage to the property or replacing damaged items on the property; (3) determine or estimate an amount and/or type of replacement or repair materials (such as replacement shingles or other roofing materials); and/or (4) estimate an insurance claim for an insured or owner of the property for their review and/or approval; and/or (c) transmitting, under the direction or control of the one or more processors, (i) the estimated damage; (ii) estimated cost of repair; (iii) estimated amount or type of replacement materials; and/or (iv) estimated insurance claim to a mobile device (such as via wireless communication and/or data transmission) associated with the insured or owner of the property for their review, modification, and/or approval.

The method may also include (i) estimating, at or via the one or more processors, a total roof area for the property via computer analysis performed on the pre-event or post-event aerial data received from the drone; (ii) determining, at or via the one or more processors, a type or current condition of shingles or other roofing materials for the property via computer analysis performed on the pre-event or post-event aerial data received from the drone; (iii) generating or updating, at or via the one or more processors, an insurance premium or discount for an insurance policy covering the property based upon (1) a total roof area for the property, and/or (2) type or current condition of shingles or other roofing materials for the property determined via computer analysis performed on the pre-event or post-event aerial data received from the drone; and/or (iv) transmitting, under the direction or control of the one or more processors, the insurance premium or discount for the insurance policy covering the property to a mobile device of the insured or home owner for their review, modification, and/or approval.

The method may further include identifying, at or via the one or more processors, multiple roof segments of a roof of the property via computer analysis performed on the pre-event and/or post-event aerial data received from the drone; and/or estimating, at or via the one or more processors, a slope, size, and/or dimension of each of the multiple roof segments via computer analysis performed on the pre-event and/or post-event aerial data received from the drone.

The method may include estimating, at or via the one or more processors, damage to one or more roof segments of the roof of the property via computer analysis performed on post-event aerial data generated or collected by a drone after an insurance-related event that has caused damage to the property; estimating, at or via the one or more processors, a cost to repair the damage to the one or more roof segments of the roof of the property via computer analysis performed on the post-event aerial data generated or collected by a drone after an insurance-related event; and/or transmitting, under the direction or control of the one or more processors, the estimated damage and/or estimated cost to repair the damage to a mobile device of an insured or home owner for their review and/or approval. Additionally or alternatively, the method may include estimating, at or via the one or more processors, damage to the roof of the property via computer analysis performed on post-event aerial data generated or collected by a drone after an insurance-related event that has caused damage to the property, such as the one or more processors comparing pre-event drone (or aerial) data with the post-event drone (or aerial) data.

Example Flight Path Determination

In one aspect, a computer-implemented method for using (high level or far away) drone image data to generate a flight path for the drone to subsequently capture up-close images of a property (and/or property damage or lack thereof) for insurance purposes may be provided. The method may include (1) capturing images of a property (such as a house or other building) via one or more cameras mounted on a drone; (2) analyzing the images (and/or associated image data) of the property via one or more processors mounted on the drone to estimate dimensions and/or height of the property; (3) analyzing the images (and/or associated image data) of the property via one or more processors mounted on the drone to determine any obstacles (e.g., trees, bushes, or vehicles) in the vicinity of the property; (4) calculating, via the one or more processors mounted on the drone, a flight path for the drone to take that leads the drone around the home and/or in close proximity (such as within a couple or a few feet of the house) based upon the estimated dimensions and/or height of the property, the flight path further being calculated to avoid any obstacles in the vicinity of the property that were detected from image analysis; (5) directing the drone to take the flight path calculated (either under the direction and control of (i) one or more drone mounted processors, or (ii) a licensed operator) to facilitate the one or more cameras of the drone capturing or generating up-close images or image data of the property and/or damage to the property (or lack thereof), the up-close images or image data intended for subsequent use in insurance-related activities (such as insurance claim handling, damage repair, claim estimation, damage estimations, insurance policy generation or adjustment, etc.). The method may include additional, less, or alternate actions, including those discussed elsewhere herein.

For instance, the flight path may take the drone within a pre-determined threshold distance of the property to facilitate acquiring up-close images or image data of high quality/accuracy, the pre-determined threshold distance being 3-5 feet. The method may include (i) transmitting the up-close images or image data, via a drone mounted transceiver, to an insurance provider remote server; (ii) estimating, via the remote server (or an associated processor), an amount of damage to the property and/or a cost to repair the damage; and/or (iii) handling or adjusting, via the remote server, an insurance claim associated with the property based upon the amount of damage, or cost to repair the damage, estimated from the up-close images or image data acquire by the drone mounted camera(s).

The method may include transmitting the up-close images or image data, via a drone mounted transceiver, to an insurance provider remote server; generating or updating, via the remote server (or associated processor(s)), an insurance policy (or premium or discount) for the property based upon computer analysis of the up-close images or image data acquired by the drone mounted camera(s); and/or transmitting, via a transceiver associated with the remote server, the new or updated insurance policy to a mobile device of an insured or home owner for their review and/or approval. The dimensions and/or height of the property may be estimated or determined, and/or the obstacles may located or locations determined, by one or more processors using GPS coordinate information from a GPS unit mounted on the drone and/or an altimeter mounted on the drone. Additionally or alternatively, the flight path may be calculated at least in part by using GPS coordinate information generated from a GPS unit mounted on the drone and/or elevation data generated from an altimeter mounted on the drone.

In another aspect, a computer-implemented method for using (high level or far away) drone image data to generate a flight path for the drone to subsequently capture up-close images of a property (and/or property damage or lack thereof) for insurance purposes may be provided. The method may include (1) capturing (far away) images of a property (such as a house or other building) via one or more cameras mounted on a drone; (2) analyzing the images (and/or associated image data) of the property via one or more processors mounted on the drone to estimate dimensions and/or height of the property; (3) calculating, via the one or more processors mounted on the drone, a flight path for the drone to take that leads the drone around the home and/or in close proximity (such as within a couple or a few feet of the house) based upon the estimated dimensions and/or height of the property; (4) directing the drone to take the flight path calculate (either under the direction and control of (i) one or more drone mounted processors, or (ii) a licensed operator) to facilitate the one or more cameras of the drone capturing or generating up-close images or image data of the property and/or damage to the property (or lack thereof), the up-close images or image data intended for subsequent use in insurance-related activities (such as insurance claim handling, damage repair, claim estimation, damage estimations, insurance policy generation or adjustment, etc.).

The method may include additional, less, or alternate actions, including those discussed elsewhere herein. For instance, the dimensions and/or height of the property may be estimated or determined by one or more processors using GPS coordinate information from a GPS unit mounted on the drone and/or an altimeter mounted on the drone.

Additional Considerations

Although the following text sets forth a detailed description of numerous different embodiments, it should be understood that the legal scope of the description is defined by the words of the claims set forth at the end of this patent and equivalents. The detailed description is to be construed as example only and does not describe every possible embodiment since describing every possible embodiment would be impractical. Numerous alternative embodiments may be implemented, using either current technology or technology developed after the filing date of this patent, which would still fall within the scope of the claims.

It should also be understood that, unless a term is expressly defined in this patent using the sentence "As used herein, the term '_____' is hereby defined to mean . . . " or a similar sentence, there is no intent to limit the meaning of that term, either expressly or by implication, beyond its plain or ordinary meaning, and such term should not be interpreted to be limited in scope based upon any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term be limited, by implication or otherwise, to that single meaning. Finally, unless a claim element is defined by reciting the word "means" and a function without the recital of any structure, it is not intended that the scope of any claim element be interpreted based upon the application of 35 U.S.C. § 112, sixth paragraph.

Accordingly, the term "security group," as used herein, may be used to refer to a group of user accounts, computer accounts, and/or other security groups which receive permission to access a certain secure data asset when the security group has permission to access the secure data asset.

As used herein, the term "secure data asset" may be used to refer to computer hardware (e.g., servers and switches), software, and/or confidential information owned by an organization. For example, secure data assets may include confidential files, proprietary information, user account information, databases, network drives, data tables within a database, files within a network drive, etc.

As used herein, the term "graph data structure," or "graph" may be used to refer to a data structure used to model relationships between objects. The graph data structure may include a collection of nodes and edges (ordered or unordered pairs of nodes) which connect the nodes.

The term "node" as used herein may be used to refer to a data point which represents an object. For example, nodes may represent users in an organizational network. A node may be displayed as a dot, a circle, and/or any other suitable indication of a data point.

The term "edge" as used herein may be used to refer to an ordered or unordered pair of nodes that connects nodes which share some common property and/or attribute. For example, two nodes which represent users who belong to the same security group may be connected by an edge in the graph data structure. An edge may be displayed as an arc, a line, and/or any other suitable indication of a connection between nodes.

The following additional considerations apply to the foregoing discussion. Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Additionally, certain embodiments are described herein as including logic or a number of routines, subroutines, applications, or instructions. These may constitute either software (e.g., code embodied on a machine-readable medium or in a transmission signal) or hardware. In hardware, the routines, etc., are tangible units capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules may provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and may operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or more processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the description. This description, and the claims that follow, should be read to include one or at least one and the singular also includes the plural unless it is obvious that it is meant otherwise.

This detailed description is to be construed as example only and does not describe every possible embodiment, as describing every possible embodiment would be impractical, if not impossible. One may be implement numerous alternate embodiments, using either current technology or technology developed after the filing date of this application.

I claim:

1. A system for collaborative, real-time inspection of insured properties, the system comprising:
a plurality of workstations, each operated by a different user with a respective role in processing an insurance claim;
a memory storing a database; and
a server system communicatively coupled to each of the plurality of workstations, the memory, and an unmanned aerial vehicle (UAV) configured to collect aerial imagery, wherein the server system is configured to:
obtain, during a pre-inspection session flight of the UAV, a plurality of aerial images of an insured property to create a three-dimensional (3D) image of the insured property based upon a stereoscopic imaging technique,
determine dimensional data associated with the insured property by analyzing the 3D image in conjunction with proximity sensor data, and
transmit an instruction to the UAV causing the UAV to autonomously perform at least a portion of an inspection session based upon the dimensional data.

2. The system of claim 1, wherein the server system is further configured to:
receive an indication of the insured property to be inspected by respective users at the plurality of workstations using the UAV, wherein one of the plurality of workstations is an operator workstation with control over the UAV, and
select an operator for the inspection session in view of at least one of (i) current availability of the operator and (ii) workload of the operator, wherein the operator uses the operator workstation to control the UAV.

3. The system of claim 2, wherein the server system is further configured to:
select the insured property to be inspected in view at least of a geographic location of the insured property.

4. The system of claim 3, wherein the server system is further configured to limit the inspection session to an area enclosed by boundaries of the insured property.

5. The system of claim 2, wherein the server system is further configured to:
transmit a message indicative of a provisional assignment of the operator for the inspection session to a user in a managerial role,
receive, from the user in the managerial role, a confirmation that the selected operator is to be assigned to the inspection session.

6. The system of claim 1, wherein the server system is further configured to:
provide, to an operator workstation with control over the UAV, a sequence of properties of the insured property to be inspected during the inspection session.

7. The system of claim 1, wherein one of the plurality of workstations is an operator workstation with control over the UAV, and the server system is further configured to:
provide, substantially in real time during the inspection session, aerial imagery of the insured property to each of the plurality of workstations,
receive, substantially in real time during the inspection session, information related to the insured property being inspected from at least some of the plurality of workstations,
receive, from at least some of the plurality of workstations, requests to zoom in on a portion of the insured property, and
forward the request to the operator workstation.

8. The system of claim 1, wherein the server system is further configured to:
receive, during the inspection session, a digital document related to the insured property from one of the plurality of workstations, and
distribute the digital document to the plurality of workstations substantially in real time.

9. The system of claim 1, wherein the server system is further configured to:
generate a database record descriptive of the inspection session, wherein the database record includes at least one of (i) photographic imagery collected during the inspection session, (ii) comments related to the insured property received from the plurality of workstations during the inspection session, and (iii) documents related to the insured property received from the plurality of workstations during the inspection session.

10. The system of claim 1, wherein the server system is further configured to:
grant access to the inspection session to users operating respective workstations based upon organizational roles of the users.

11. A computer-implemented method for conducting a collaborative, real-time inspection of insured properties, the method comprising:
obtaining, during a pre-inspection session flight of an unmanned aerial vehicle (UAV) configured to collect aerial imagery, a plurality of aerial images of an insured property to create a three-dimensional (3D) image of the insured property based upon a stereoscopic imaging technique;
determining, by one or more processors, dimensional data associated with the insured property by analyzing the 3D image in conjunction with proximity sensor data; and
causing, by the one or more processors, the UAV to autonomously perform at least a portion of an inspection session based upon the dimensional data.

12. The method of claim 11, further comprising:
prior to the inspection session, receiving, by the one or more processors, an indication of the insured property to be inspected by respective users at a plurality of workstations using the UAV, wherein one of the plurality of workstations is an operator workstation with control over the UAV; and selecting, by the one or more processors, an operator for the inspection session in view of at least one of (i) current availability of the operator and (ii) workload of the operator, wherein the operator uses the operator workstation to control the UAV.

13. The method of claim 12, further comprising:

selecting, by the one or more processors, the insured property to be inspected in view at least of a geographic location of the insured property.

14. The method of claim 13 further comprising limiting the inspection session to an area enclosed by boundaries of the insured property.

15. The method of claim 12, further comprising:

transmitting, by the one or more processors, a message indicative of a provisional assignment of the operator for the inspection session to a user in a managerial role; and receiving, by the one or more processors from the user in the managerial role, a confirmation that the selected operator is to be assigned to the inspection session.

16. The method of claim 11, further comprising:

providing, by the one or more processors to an operator workstation with control over the UAV, a sequence of properties of the insured property to be inspected during the inspection session.

17. The method of claim 11, further comprising:

providing, by the one or more processors substantially in real time during the inspection session, aerial imagery of the insured property to each of a plurality of workstations using the UAV, wherein one of the plurality of workstations is an operator workstation with control over the UAV;

receiving, by the one or more processors substantially in real time during the inspection session, information related to the insured property being inspected from at least some of the plurality of workstations;

receiving, by the one or more processors from at least some of the plurality of workstations, requests to zoom in on a portion of the insured property; and forwarding, by the one or more processors, the request to the operator workstation.

18. The method of claim 11, further comprising:

receiving, by the one or more processors during the inspection session, a digital document related to the insured property from one of a plurality of workstations using the UAV, and distributing, by the one or more processors, the digital document to the plurality of workstations substantially in real time.

19. The method of claim 11, further comprising:

generating, by the one or more processors, a database record descriptive of the inspection session; and including, by the one or more processors in the database record at least one of (i) photographic imagery collected during the inspection session, (ii) comments related to the insured property received from a plurality of workstations using the UAV during the inspection session, and (iii) documents related to the insured property received from the plurality of workstations during the inspection session.

20. The method of claim 11, further comprising:

granting, by the one or more processors, access to the inspection session to users operating respective workstations based upon organizational roles of the users.

* * * * *